US009786012B2

(12) United States Patent
Besman et al.

(10) Patent No.: US 9,786,012 B2
(45) Date of Patent: Oct. 10, 2017

(54) CALIBRATED UNDERWRITING SYSTEM

(71) Applicant: Hartford Fire Insurance Company, Hartford, CT (US)

(72) Inventors: Eric D. Besman, Manchester, CT (US); Jeffery T. Hay, Avon, CT (US); Douglas Joseph Onnen, Southington, CT (US); Pamela Sealand Reale, South Glastonbury, CT (US); Joseph E. Wells, II, West Hartford, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 303 days.

(21) Appl. No.: 14/571,653

(22) Filed: Dec. 16, 2014

(65) Prior Publication Data
US 2016/0171618 A1 Jun. 16, 2016

(51) Int. Cl.
*G06Q 40/08* (2012.01)
(52) U.S. Cl.
CPC .................. *G06Q 40/08* (2013.01)
(58) Field of Classification Search
CPC ....................................... G06Q 40/08
USPC ............................................. 705/4
See application file for complete search history.

(56) References Cited

U.S. PATENT DOCUMENTS

| 8,145,507 | B2* | 3/2012 | Zizzamia | G06Q 10/0635 705/38 |
| 8,234,155 | B2* | 7/2012 | Malov | G06Q 30/0206 705/7.35 |
| 8,463,699 | B2* | 6/2013 | Karlinski, III | G06Q 40/08 705/35 |
| 8,655,687 | B2* | 2/2014 | Zizzamia | G06Q 10/0635 705/4 |
| 8,666,786 | B1* | 3/2014 | Wirz | G06Q 40/08 705/30 |
| 2002/0138307 | A1 | 9/2002 | Kramer | |
| 2009/0119133 | A1 | 5/2009 | Yeransian et al. | |
| 2012/0271664 | A1 | 10/2012 | McGiffin et al. | |
| 2014/0149150 | A1 | 5/2014 | Zizzamia et al. | |

* cited by examiner

*Primary Examiner* — Edward Chang
(74) *Attorney, Agent, or Firm* — Howard IP Law Group, PC

(57) ABSTRACT

According to some embodiments, account information may be received in connection with a potential insurance policy. A premium indication portal processor may receive, from a risk score model application, an account score matrix for the potential insurance policy, including grade values comparing the account information with other insured policies in a risk database, along with a benchmark premium value calibrated to a target return on equity based on the account information and information in the risk database. The account score matrix may be displayed on an underwriter device, and guide indication adjustments may be received from the underwriter device for the potential insurance policy. The premium indication portal processor may then automatically calculate an adjusted premium value calibrated to the target return on equity based at least in part on the guide indication adjustments.

20 Claims, 21 Drawing Sheets

FIG. 6

PREMIUM INDICATION PORTAL

PREMIUM INDICATION PORTAL -- ACCOUNTS DETAILS: WEST CO.

| HOME | ACCOUNTS | WC PIM | AUTO PIM | GL PIM | PROP PIM | DASHBOARDS |

ACCOUNT ID: 123456  
NAME: WEST CO.  
AGENCY: SMITH NATIONAL  
UNDERWRITER: MARY JONES

EFFECTIVE YEAR: 2018  
EFFECTIVE MONTH: NOVEMBER  
STATUS: OPEN  
TRANSACTION TYPE: RENEWAL

| POLICY # | EFFECTIVE DATE | PIM STATUS | QUOTE # | EXPIRING PREMIUM | ACTION |
|---|---|---|---|---|---|
| WC 0001 | 11/1/2018 | QUOTE NOT TAKEN | 1 | $$$$$$ | GO TO PIM |
| AUTO 0001 | 11/1/2018 | QUOTE NOT TAKEN | 4 | $$$$$$ | GO TO PIM |
| GL 001 | 11/1/2018 | QUOTE NOT TAKEN | 9 | $$$$$$ | GO TO PIM |
| GL 002 | 11/1/2018 | QUOTE NOT TAKEN | 1 | $$$$$$ | GO TO PIM |

| LOB | PIM STATUS | BENCHMARK | GUIDE | SOLD |
|---|---|---|---|---|
| WC | IN PROGRESS | $150000.00 | $150000.00 | $0.00 |
| AUTO | COMPLETED | $160000.00 | $160000.00 | $160000.00 |
| GL | IN PROGRESS | $114000.00 | $120000.00 | $0.00 |

PREMIUM INDICATION PORTAL

PREMIUM INDICATION PORTAL -- WORKERS' COMPENSATION SUMMARY: WEST CO.

HOME | ACCOUNTS | WC PIM | AUTO PIM | GL PIM | PROP PIM | DASHBOARDS — 910

WORKERS COMPENSATION SUMMARY — 920

TRANSACTION TYPE: REFER RENEWAL
POLICY CLASS: 3076
CURRENT ANNUAL PAYROLL: $13,907,000
TOTAL NUMBER OF EMPLOYEES: 258

| STATE | CLASS | BENCHMARK FACTOR |
|---|---|---|
| IL | 3,757 | 0.91 |
| OK | 573,085 | 0.58 |
| MI | 8,540 | 0.76 |

— 930

| WC CLAIM INPUTS | EXPIRING TERM | FIRST PRIOR YEAR | SECOND PRIOR YEAR | THIRD PRIOR YEAR | TOTAL |
|---|---|---|---|---|---|
| PAYROLL | 11,512,752 | 14,000,426 | 14,708,988 | 14,000,426 | 40,222,166 |
| TOTAL CLAIMS | 31 | 45 | 41 | 45 | 117 |
| MEDICAL CLAIMS | 3 | 9 | 3 | 9 | 15 |
| INDEMNITY | | | | | |

— 940

| MODEL VARIABLE | RESULT AVERAGE (ACCOUNT) | RELATIVES RANGE (ACCOUNT) | IMPACT | ACCOUNT GRADING (% BETTER THAN ALL ACCOUNTS) |
|---|---|---|---|---|
| AVERAGE WAGE | 100% (135%) | 0.84-1.21 (0.84) | (A) | 70% - 80% |
| CLAIM FREQ. | 0.15 (0.31) | 0.83-1.62 (1.16) | (E) | 30% - 40% |
| BUSINESS CREDIT | 12 (3) | 0.89-1.08 (0.93) | (B) | 70% - 80% |
| PAYROLL SIZE | 7.5 MILL (25 MILL) | 0.73-1.35 (0.92) | (B) | 80% - 90% |
| | | | COMBINED RESULT: 60% - 70% | |

— 950

PREMIUM INDICATION PORTAL

PREMIUM INDICATION PORTAL – ACCOUNT PREMIUM SUMMARY: WEST CO.

ACCOUNT ID: 123456

NAME: WEST CO.

AGENCY: SMITH NATIONAL

UNDERWRITER: MARY JONES — 1310

EFFECTIVE YEAR: 2018

EFFECTIVE MONTH: NOVEMBER

STATUS: OPEN

TRANSACTION TYPE: RENEWAL

— 1320

| NEW/RENEWAL | EFFECTIVE DATE | LOB | TOTAL ACCOUNT PREMIUM | PREM MIX | PREM SOLD-TO-BENCHMARK | SOLD-TO-GUIDE | EXPECTED SOLD ROE | NET RATE CHANGE | COMM % |
|---|---|---|---|---|---|---|---|---|---|
| RENEWAL | 7/1/2018 | PROP | $45,000 | 27% | 105% | 110% | 27% | 5.0% | 15% |
| RENEWAL | 7/2/2018 | GL | $30,000 | 18% | 95% | 90% | 2% | 3.5% | 15% |
| RENEWAL | 7/3/2018 | AUTO | $15,000 | 9% | 97% | 97% | 13% | 12.0% | 15% |
| NEW | 7/4/2018 | WC | $75,000 | 45% | 98% | 115% | 33% | N/A | 0% |
| | | TOTAL: | $165,000 | 100% | 98% | 107% | 25% | 5.5% | |

| LINE OF BUSINESS | EXPIRING % OF MANUAL | PROSPECTIVE % OF MANUAL |
|---|---|---|
| PROPERTY | 0.90 | 0.95 |
| GENERAL LIABILITY | 0.75 | 0.70 |
| AUTO | 1.15 | 1.25 |
| WORKERS' COMP | | 0.80 |

| GUIDE EVALUATION | | | |
|---|---|---|---|
| SEVERITY EXPOSURE DIFFERS AS COMPARED TO TYPICAL RISK | 0.9 ——[]—— 1.2 | 0.98 | AVERAGE |
| FREQUENCY EXPOSURE DIFFERS AS COMPARED TO TYPICAL RISK | 0.9 ——[]—— 1.2 | 0.92 | WORSE THAN AVERAGE |
| EXPOSURE CHANGE DUE TO NEW OPERATION IN PAST TWO YEARS | 0.8 ——[]—— 1.5 | 1.2 | BETTER THAN AVERAGE |
| RAPID CHANGE IN PAYROLL (PLUS OR MINUS 20%) | 0.9 ——[]—— 1.1 | 1.0 | BETTER THAN AVERAGE |
| CHANGE IN AUTOMATION OR FACILITIES IN PAST TWO YEARS | 0.5 ——[]—— 1.8 | 0.8 | WORSE THAN AVERAGE |

CALIBRATED UNDERWRITING SYSTEM

FIELD

The present invention relates to computer systems and more particularly to computer systems that facilitate insurance underwriting.

BACKGROUND

Many factors may be considered when determining an appropriate premium for a potential insurance policy. The level of risk associated with the potential insurance policy and the insurer's interest in profit and/or desire for growth may be considered by an underwriter to determine an appropriate insurance premium quote. Moreover, different factors may have different implications depending on a particular line of business (e.g., workers' compensation or general liability insurance), industry, or geographic region associated with the potential insurance policy. Appropriately considering such factors, however, may be a time consuming process and can lead to errors or delays, especially when a substantial number of submissions are received, of many different lines of business, that need to be priced appropriately. For example, a group of underwriters might handle a large number of submissions (which might represent a substantial amount of business), and it may be important that various factors are considered and applied by the underwriters in a consistent manner. It would therefore be desirable to provide systems and methods to facilitate underwriting decisions in an automated, efficient, and accurate manner.

SUMMARY

According to some embodiments, systems, methods, apparatus, computer program code and means may facilitate underwriting decisions. In some embodiments, account information may be received in connection with a potential insurance policy. A premium indication portal processor may receive, from a risk score model application, an account score matrix for the potential insurance policy, including grade values comparing the account information with other insured policies in a risk database, along with a benchmark premium value calibrated to a target return on equity based on the account information and information in the risk database. The account score matrix may be displayed on an underwriter device, and guide indication adjustments may be received from the underwriter device for the potential insurance policy. The premium indication portal processor may then automatically calculate an adjusted premium value calibrated to the target return on equity based at least in part on the guide indication adjustments.

A technical effect of some embodiments of the invention is an improved and computerized method to facilitate underwriting decisions. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 6 is an example of a premium indication portal accounts page in accordance with some embodiments.

FIG. 7 is an example of a premium indication portal account detail page in accordance with some embodiments.

FIG. 9 is an example of a premium indication portal workers' compensation summary page in accordance with some embodiments.

FIG. 13 is an example of a premium indication portal account premium summary page in accordance with some embodiments.

FIG. 20 illustrates a tablet computer with an insurance underwriting enterprise portal home page display in accordance with some embodiments.

DETAILED DESCRIPTION

Figure 1:
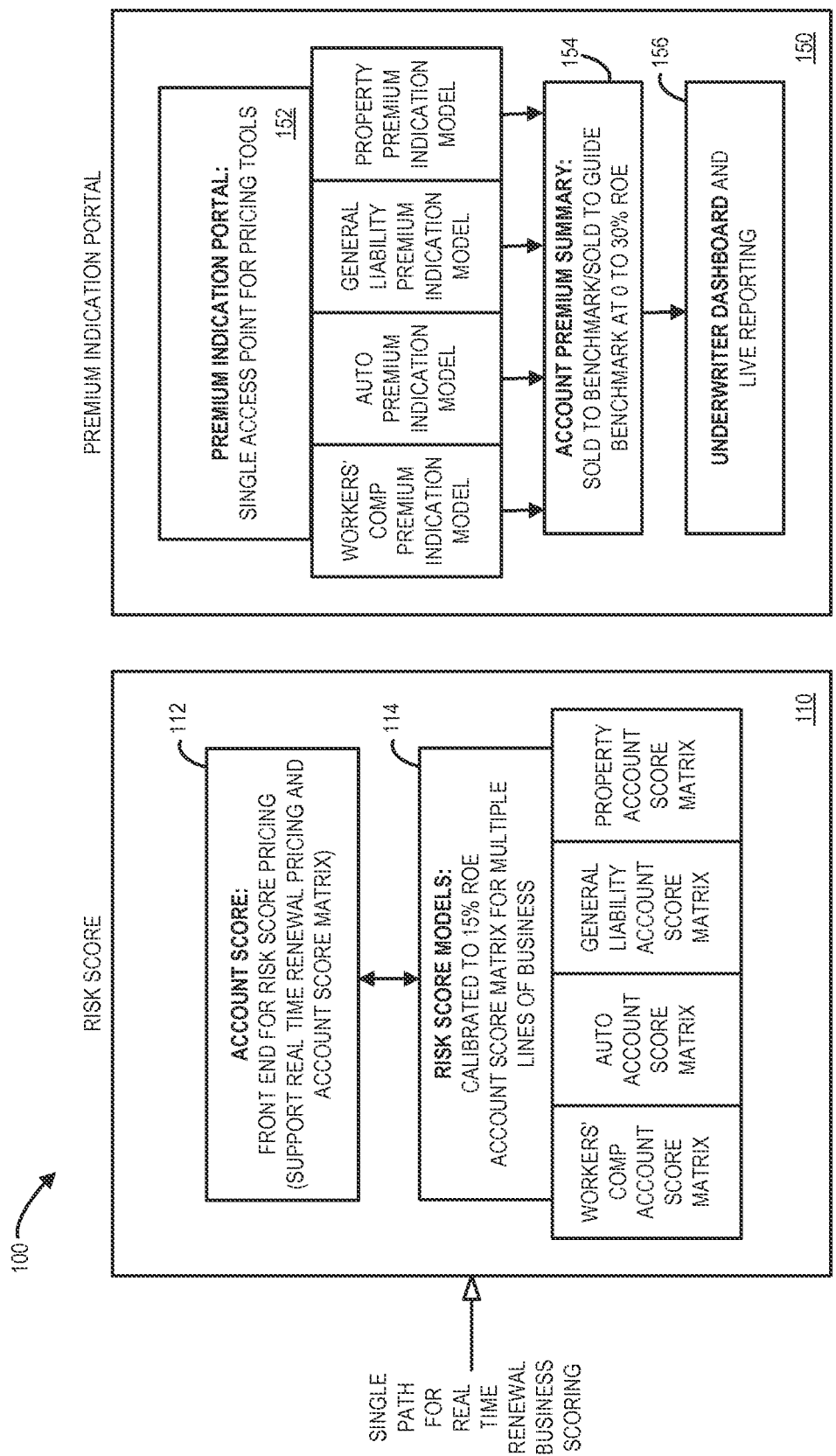
FIG. 1 is block diagram of a system according to some embodiments of the present invention.

Note that some embodiments may be associated with an insurance underwriting platform or tools able to facilitate pricing for multiple different types of insurance, or lines of business, including workers' compensation insurance, commercial automobile insurance, commercial property insurance, general liability insurance, etc. While some examples described herein are described with respect to commercial insurance policies, some embodiments may also be implemented in connection with personal insurance policies. Moreover, different factors, such as the level of risk and the insurer's interest in profit and/or desire for growth, may be considered when determining an appropriate premium for a potential insurance policy. Appropriately considering such factors, however, may be a time consuming process and can lead to errors or delays, especially when a substantial number of submissions are received in connection with many different lines of business. To address such issues, FIG. 1 is block diagram of a system 100 to facilitate underwriting decisions according to some embodiments of the present invention. The system 100 comprises a data sharing architecture for insurance underwriting associated with any exchange of information between the various elements and components described herein. In particular, the system 100 includes a risk score platform 110 that provides a single path for real-time renewal and new business scoring. The system 100 further includes a premium indication portal 150 that may be accessed by underwriters.

According to some embodiments, the risk score platform 110 and/or premium indication portal 150 may retrieve information from an insurance policy database, an underwriter database, and/or a claim database. In some embodiments, the risk score platform 110 and/or premium indication portal 150 may also receive information from a third party platform (e.g., when a potential insurance policy is associated with automobile insurance, some information may be copied from a state department of motor vehicles platform).

The risk score platform 110 may include an account score engine 112 and a number of risk score model applications 114 calibrated to a pre-determined target return on equity goal for multiple lines of business (e.g., workers' compensation, automobile, general liability, and property insurance). The risk score model applications 114 may, according to some embodiments, create a "score matrix" associated with levels of risk associated with a potential insurance policy.

The premium indication portal 150 may include a premium indication portal single access point for pricing tools 152. The access point 152 may be used to interface with premium indication model applications for each line of business, including any account guidance provided by underwriters. The output of these model applications may be fed to an account premium summary 154 which in turn may update information in an underwriter dashboard and/or live reporting element 156.

The risk score platform 110 and/or premium indication portal 150 may operate in substantially real time (as opposed to on a batch or quarterly basis) to support development of real time renewal risk score execution as well as new business policies. The risk score platform 110 and/or premium indication portal 150 might be, for example, associated with a Personal Computer ("PC"), laptop computer, an enterprise server, a server farm, a cloud based solution, and/or a database or similar storage devices. The risk score platform 110 and/or premium indication portal 150 may, according to some embodiments, be associated with an insurance provider.

According to some embodiments, an "automated" risk score platform 110 and/or premium indication portal 150 may facilitate underwriting decisions. For example, the risk score platform 110 and/or premium indication portal 150 may automatically output account scores, score matrixes, premium values, etc. to an underwriter device. As used herein, the term "automated" may refer to, for example, actions that can be performed with little (or no) intervention by a human. Moreover, any of the embodiments described herein may be "dynamically" performed by monitoring parameters and/or automatically updating the risk score platform 110 and/or premium indication portal 150 in substantially real time.

As used herein, devices, including those associated with the risk score platform 110, premium indication portal 150, and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The risk score platform 110 and/or premium indication portal 150 may store information into and/or retrieve information from the databases. The databases may be locally stored or reside remote from the risk score platform 110 and/or premium indication portal 150. According to some embodiments, the risk score platform 110 and/or premium indication portal 150 communicates summary reports (e.g., based on a line or business, underwriter, or office), such as by transmitting an electronic file to a manager, an underwriter device, an insurance agent or analyst platform, an email server, a workflow management system, etc.

Although a single risk score platform 110 and premium indication portal 150 are shown in FIG. 1, any number of such devices may be included. Moreover, various devices described herein might be combined according to embodiments of the present invention. For example, in some embodiments, the risk score platform 110 and the premium indication portal 150 might be co-located and/or may comprise a single apparatus.

Figure 2:
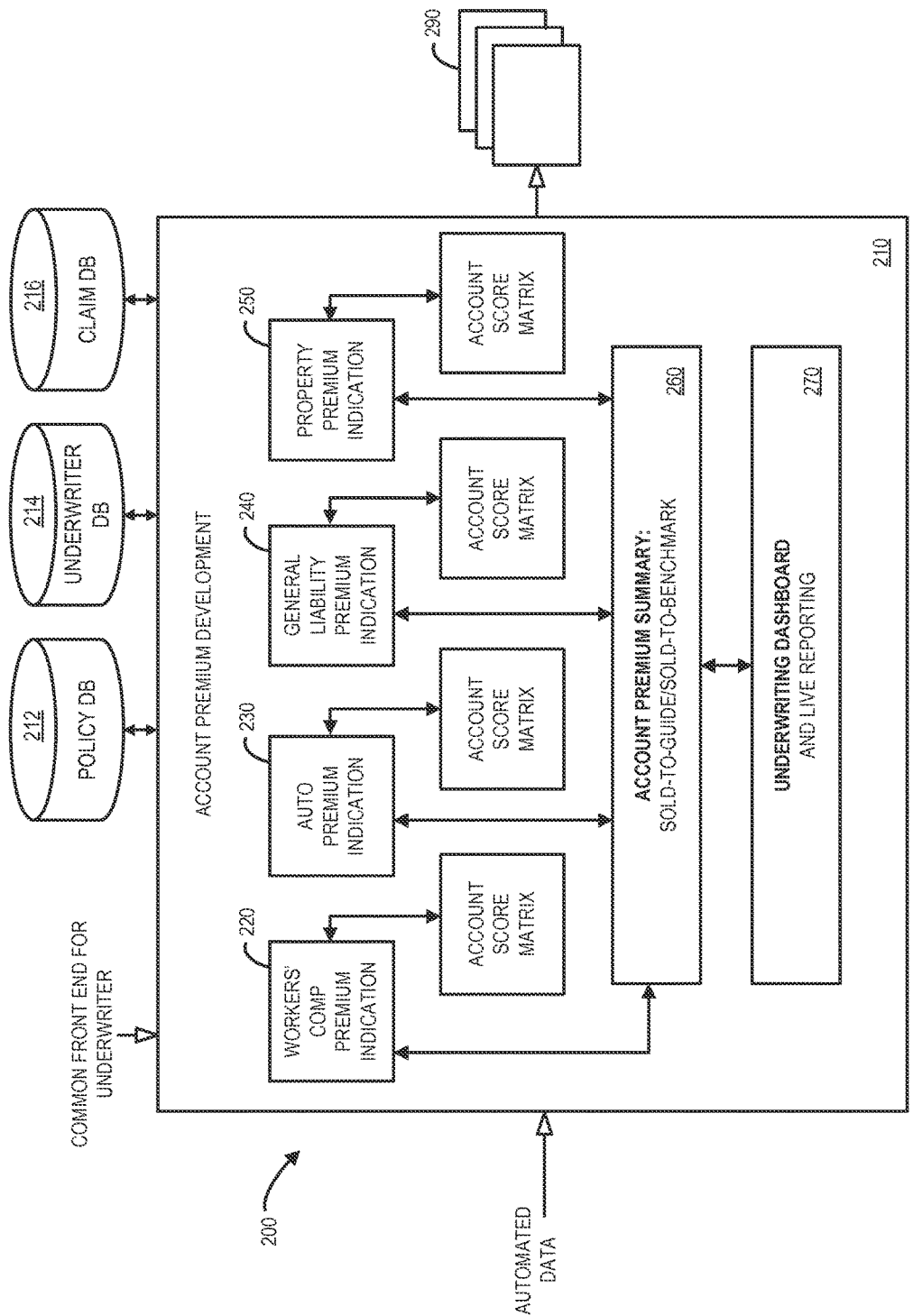
FIG. 2 illustrates a pricing environment in accordance with some embodiments.

The risk score platform 110 and the premium indication portal 150 may be used to facilitate underwriting decisions. For example, FIG. 2 illustrates a pricing environment 200 in accordance with some embodiments. The pricing environment 200 includes an account premium development platform 210 that receives automated data (e.g., information about past insurance claim frequency associated with a potential insurance policy renewal) and provides information to downstream systems and reports 290. According to some embodiments, the account premium development platform 210 may retrieve information from an insurance policy database 212, an underwriter database 214, and/or a claim database 216. The account premium development platform 210 includes a workers' compensation premium indication 220, an automotive premium indication 230, a general liability premium indication 240, and a property premium indication 250, each of which may generate an account score matrix in accordance with any of the embodiments described herein. The workers' compensation premium indication 220, automotive premium indication 230, general liability premium indication 240, and property premium indication 250 may also provide information to an account premium summary 260, including sold-to-guide and sold-to-benchmark comparisons which may be accessed via one or more underwriter dashboards and/or live reporting elements 270 (e.g., providing a display that may be used to monitor underwriter performance).

Figure 3:
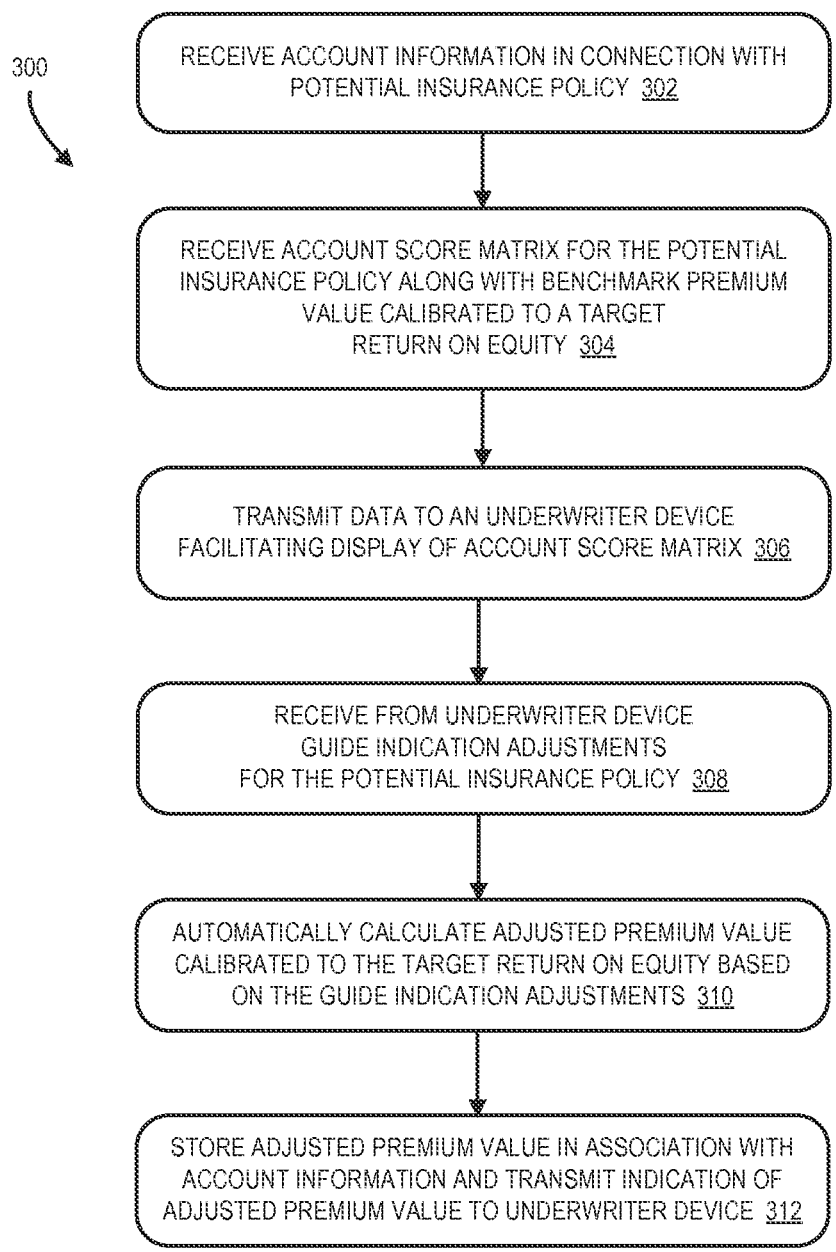
FIG. 3 illustrates a method that might be performed in accordance with some embodiments.

FIG. 3 illustrates an underwriting method 300 that might be performed by some or all of the elements of the systems 100, 200 described with respect to FIGS. 1 and 2 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 302, account information may be received in connection with a potential insurance policy. As used herein the phrase "potential insurance policy" may refer to a new potential insurance policy or a potential renewal of an existing insurance policy. The account information received at 302 might include, for example, an account name, an account identifier, insurance agency information, location information, an underwriter identifier, effective time period information, a status, a transaction type, at least one insurance policy identifier, an industry code, and/or an industry description. Note that the account information is associated with a plurality of different types of potential insurance policies (e.g., account information might be received in connection with renewal of both workers' compensation and automobile insurance policies for an existing customer).

At 304, an account score "matrix" for the potential insurance policy may be received from a risk score model application. As used herein, the term "matrix" may refer to any set of scores, including a score card listing one or more account grades, categories, and/or numeric values. The account score matrix may, for example, include grade values comparing the account information to other insured parties. For example, the account score matrix might include grade values for each of a plurality of risk variables in the risk database, each grade reflecting a percentage of other insured parties having a level of risk, for the associated risk variable, worse than the potential insurance policy. The risk variables might be associated with, by way of examples only, wage information, prior indemnity claim frequency data, geographic information, an industry classification, prior medical claim frequency, business credit, a payroll size, and/or a location count. Along with the account score matrix, a benchmark premium value may be received, and the benchmark premium value may be calibrated to a target Return On Equity ("ROE") based on the account information and information in the risk database. When used in connection with insurance, the phrase "return on equity" may refer to, for example, a measure of the relationship between the operating result (net income) of a company and its equity (a risk adjusted measure of an amount of funds required to absorb all unforeseen negative financial occurrences, whether these are based on insurance risks or other risks not specific to insurance).

At 306, data may be transmitted to facilitate display of the account score matrix on an "underwriter device." As used herein, the phrase "underwriter device" might refer to, for example, a PC displaying a portal via a browser or a handheld wireless device capable of exchanging information with other elements of the system. At 308, guide indication adjustments for the potential insurance policy may be received from the underwriter device. For example, each guide indication adjustment might comprise a selection, via the underwriter device, of a value between a minimum allowable adjustment and a maximum allowable adjustment for a guide evaluation factor. Examples of guide evaluation factors may include an unusual severity exposure, an unusual frequency exposure, a new operation, a rapid change in payroll, a change in automation or facilities, and/or a loss control program.

At 310, a premium indication model application may automatically calculate an adjusted premium value. The adjusted premium value may also be calibrated to the target return on equity based at least in part on the guide indication adjustments. Note that the premium indication model application might comprises one of a workers' compensation insurance premium indication model application, an automobile insurance premium indication model application, a general liability insurance premium indication model application, or a property insurance premium indication model application. At 312, the adjusted premium value may be stored in association with the account information, and an indication of the adjusted premium value may be transmitted to the underwriter device.

Figure 4:
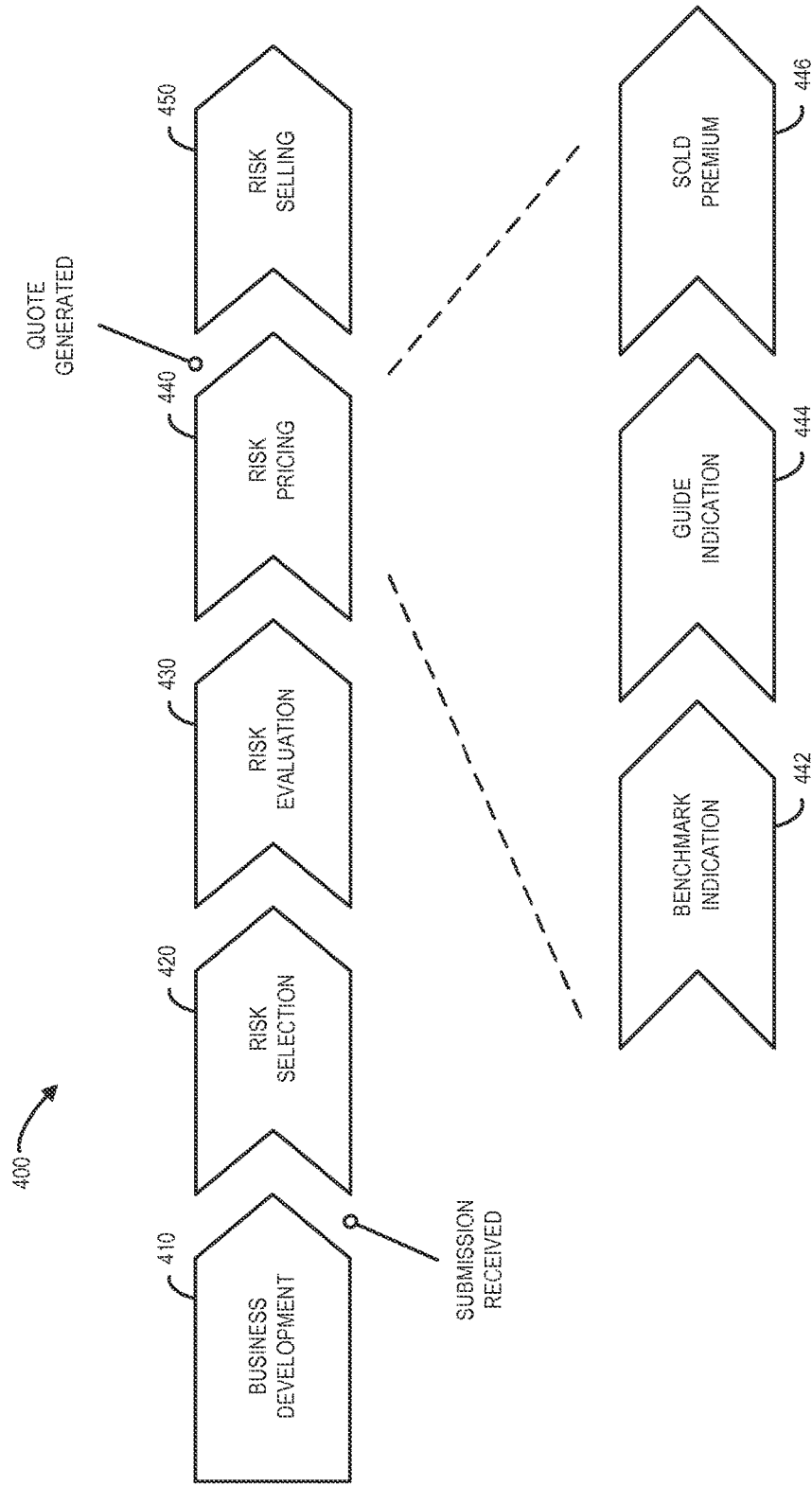
FIG. 4 is a high-level view of the underwriting process in accordance with some embodiments.

FIG. 4 is a high-level view 400 of the underwriting process in accordance with some embodiments. The view 400 begins with a business development process 410 that may consider an insurer's desire or appetite for various lines of business and types of customers. When a submission is received, a risk selection process 420 may gather the necessary underwriting information, evaluate individual risks and a high level loss analysis may be compared to premium development. During a risk evaluation process 430, an exposure and/or control analysis may be performed, terms and conditions may be evaluated, and reinsurance factors may be considered.

Next, a risk pricing process 440 generates a quote in response to the submission. The risk pricing process 440 may begin with a benchmark indication process 442 may automatically generate a benchmark premium value for the potential insurance policy. The benchmark premium value may be associated with an account score and/or an account score matrix and reflect what a model application or tool considers an appropriate premium calibrated to a pre-determined target return on equity. For example, the benchmark premium might be calibrated to a 15% return on equity.

Note that insurance underwriting performance is sometimes measured and/or evaluated using a "combined ratio." In particular, a loss ratio may compare an insurer's incurred losses with its earned premiums for a specific period of time. The figure for incurred losses includes loss adjustment expenses and is calculated as follows:

$$\text{Loss Ratio} = \frac{\text{Incurred Losses}}{\text{Earned Premiums}}$$

An expense ratio compares an insurer's underwriting expenses with its written premiums for a specific period of time, and is calculated as follows:

$$\text{Expense Ratio} = \frac{\text{Incurred Underwriting Expenses}}{\text{Written Premiums}}$$

The combined ratio (trade basis) combines the loss ratio and the expense ratio to compare inflows and outflows from insurance underwriting. The combined ratio is calculated as follows:

$$\text{Combined Ratio} = \frac{\text{Incurred Losses}}{\text{Earned Premium}} + \frac{\text{Incurred Underwriting Expenses}}{\text{Written Premiums}}$$

According to some embodiments described herein, premiums are calibrated to a return on equity instead of the combined ratio. The return on equity is calculated by dividing an enterprises net income by the average amount of owner's equity for a specific period, and may let investors compare the return that could have been obtained by investing in the insurer with the potential gains that could have been earned by investing elsewhere. In general, the owner's equity is invested in operations to generate income for the enterprise. For insurers, the policyholders' surplus may be invested in underwriting activities and the return on equity may be calculated as follows:

$$\text{Return on Equity} = \frac{\text{Net Income}}{\text{Owners' Equity}}$$

Note that the owners' equity component of the return on equity may reflect appropriate allocations across insurance lines of business based on risk, volatility, and/or timing issues. As a result, the return on equity may help equalize and/or normalize comparisons across different lines of business as compared to the traditional use of combined ratio values.

After the benchmark indication process 442, a guide indication process 444 may receive guide evaluation adjustments from the underwriter. That is, the underwriter's expertise may be used to deviate from the benchmark premium value, while still calibrating this adjusted premium value to the target return on equity. After the guide indication process 444, a sold premium process 446 may determine how the price developed by the rating plan compares to the indication, and is the insurer willing to add this risk to the book at that price and return on equity value. Note that the sold premium process 446 may be developed using filed or regulated rating plans.

After the risk pricing process 440 generates the appropriate quote, a risk selling process 450 may complete the high level underwriting process 400. For example, the risk selling process 450 may include actually selling the benefits, giving a service presentation, and/or negotiating via an insurance agent or broker. According to some embodiments, the system may further associate the account information with a sold premium value. In this case, an underwriter might be evaluated based on, for example, guide indication adjustments for a plurality of potential insurance policies along with sold premium values and subsequent loss information associated with the plurality of potential insurance policies. That is, some underwriters may provide more accurate guide indications as compared to other underwriters (and that may also vary depending on the line of business, type of customer, etc.).

Figure 5:
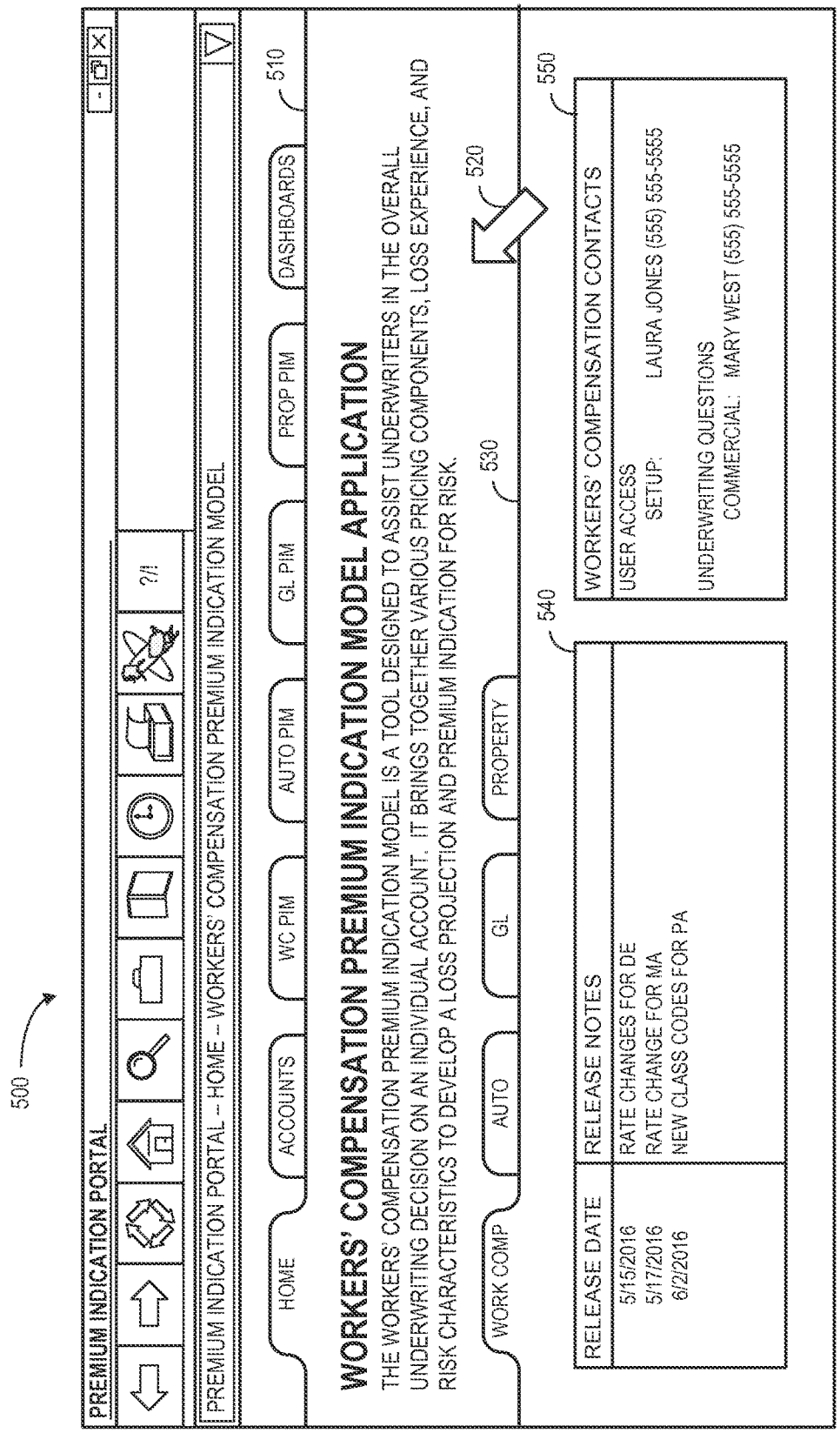
FIG. 5 is an example of a premium indication portal home page in accordance with some embodiments.

FIG. 5 is an example of a premium indication portal home page 500 in accordance with some embodiments. The home page 500 may include high level tab selections 510 allowing the underwriter use a touch screen or pointer 520 to access the home page 500, an accounts page, a workers' compensation premium indication model application, an automotive premium indication model application, a general liability premium indication model application, a property premium indication model application, and/or dashboard displays.

A lower level tab selection 530 may let the underwriter see information about a workers' compensation model application, an automotive model application, a general liability model application, and/or a property model application. In the example of FIG. 5, information about a workers' compensation model application includes release date and notes 540 and contact information 550 for the workers' compensation model application.

Figure 6:
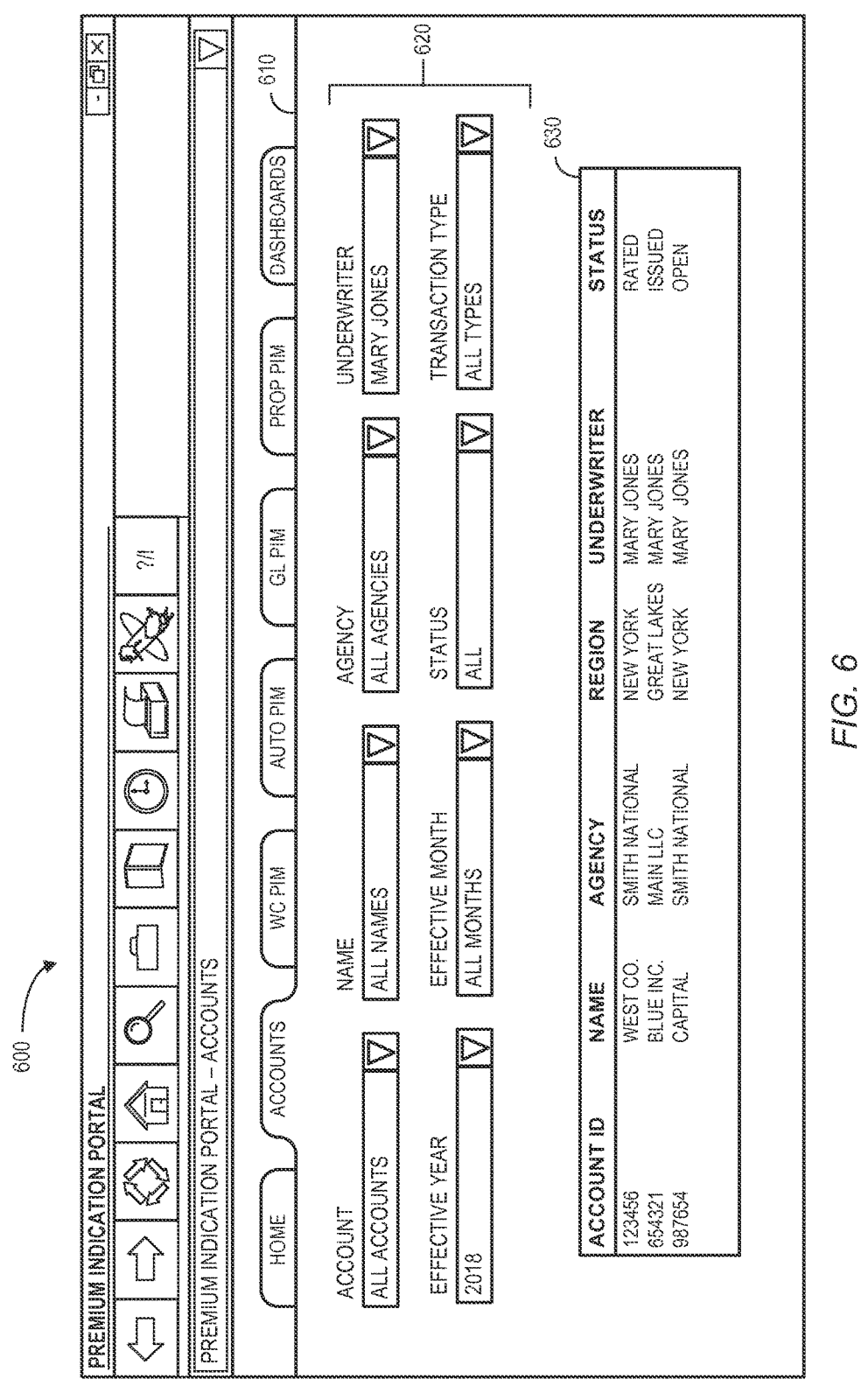

FIG. 6 is an example of a premium indication portal accounts page 600 in accordance with some embodiments. That is, the underwriter has selected "Accounts" in the high level tab selections 610. As a result, account information filters 620 may be used to search for insurance accounts based on, name, agency, underwriter, effective month and year, status, and/or transaction type (e.g., new or renewal policies). In the example of FIG. 6, a result list 630 meeting the filters 620 (1) underwriter="Mary Jones" and (2) effective year="2018" is provided and includes, for each account: an account identifier, an account name, an agency, a region, an underwriter, and a status. Note that other information might also be included in the account details.

Selection of one of the accounts in the result list 630 may lead to additional information about that particular account being displayed. For example, FIG. 7 is an example of a premium indication portal account detail page 700 in accordance with some embodiments. Under the high level tab selection 710, the account details 720 are provided for the particular account ("West Co." in the example of FIG. 7). Moreover, details about a number of different insurance policies 730 may include a policy number, an effective date, a premium indication model application status, a number of quotes, an expiring premium amount, and a selectable action to be taken by the underwriter. An additional summary status display 740 may, for each line of business, provide a premium indication model application status along with benchmark, guide, and sold values.

Figure 8:
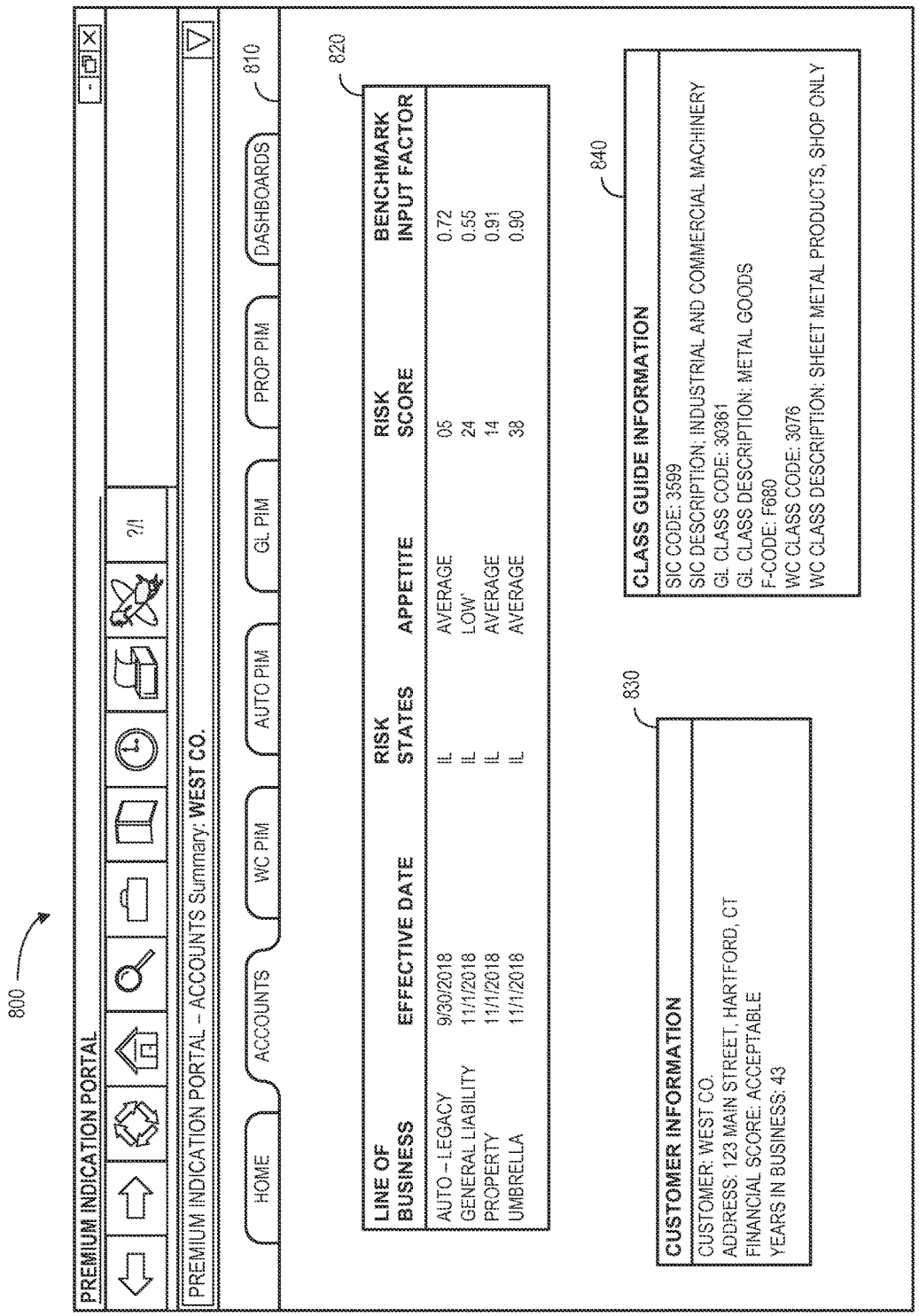
FIG. 8 is an example of a premium indication portal account score detail page in accordance with some embodiments.

FIG. 8 is an example of a premium indication portal account score detail page 800 in accordance with some embodiments. Under the high level tab selection 810, account score details 820 may be provided for each line of business. In particular, the score details 820 may include an effective date, geographic information (one or more US states associated with the risk), appetite, a risk score, and a benchmark input factor. The account score detail page 800 may further display customer information 830 and class guide information 840 associated with the account (e.g., identifying industry codes that can be used to help assess risk).

FIG. 9 is an example of a premium indication portal workers' compensation summary page 900 in accordance with some embodiments. Under the high level tab selection 910, workers' compensation summary information 920 may include a transaction type, an insurance policy class, a payroll size in dollars, and a total number of employees. The summary page 900 may further display, on a state-by-state basis, a class and benchmark factor 930. In addition, a history portion 940 may detail payroll size, a total number of claims filed, a number of medical claims filed, and a number of indemnity claims filed on a year-by-year basis (e.g., including data from the insurer in the case of renewals and/or prior insurers).

The summary page 900 may further include an account score matrix 950 providing, for different model application variables, average and account results, model application relative ranges and a value for this particular account within that range. The account score matrix 950 may further provide an impact score or grade for each variable along with a percentage value comparing the level of risk for the account to all other accounts. For example, an impact score of "B" might indicate that the account has a level of risk that is between 5% and 15% better as compared to the average model application result, and as a result, the account might compare favorably to between 80% and 90% of other accounts. The account score matrix 950 may be associated with, for example, the benchmark indication process 442 described with respect to FIG. 4. The account score matrix 950 might be based on various risk factors depending on the line of business associated with the potential insurance policy. For example, a workers' compensation insurance policy might have an account score matrix 950 listing payroll size, average wage, prior indemnity claim frequency, geographic, industry classification, prior medical claim frequency, an overall number of locations, and or business credit risk factors. Other types of insurance policies may have account score matrixes including other risk factors, such as: a number of years in business, a fleet size, driver age information, vehicle weight information, an overall exposure size, an exposure type, a building age, and weather related data. Note that an account score matrix 950 might assign different weights to different risk factors to determine an overall account score.

Figure 10:
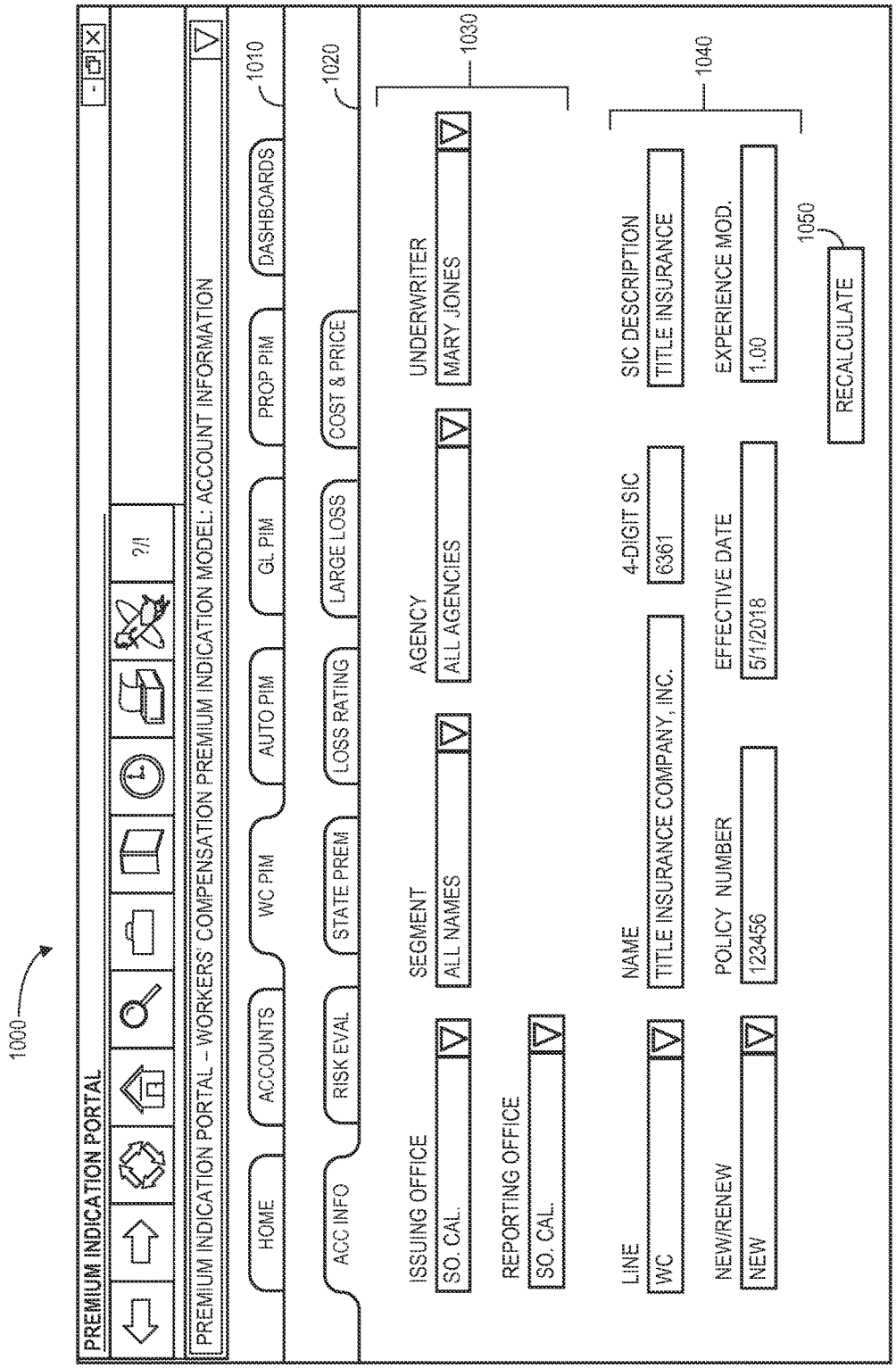
FIG. 10 is an example of a premium indication portal workers' compensation premium indication model application page in accordance with some embodiments.

FIG. 10 is an example of a premium indication portal workers' compensation premium indication model application page 1000 in accordance with some embodiments. That is, the "WC PIM" tab has been selected in the high level tab selection 1010. A lower level tab selection 1020 now lets the underwriter select "account information," "risk evaluation," "state premiums," "loss rating," "large loss," or "cost and price" tabs. In the example of FIG. 10, "account information" has been selected in the lower level tab selection 1020, and, as a result, a first area 1030 may let a user enter (via drop down menus), an issuing office, a segment, an agency, an underwriter, and a reporting office. A second area 1040 may let the underwriter enter a line of business, name, 4-digit SIC and description, a transaction type, a policy number, an effective date, and an experience modifier for the account. The underwriter may also activate a recalculate icon 1050 causing the premium indication model application to be re-executed for that account.

Figure 11:
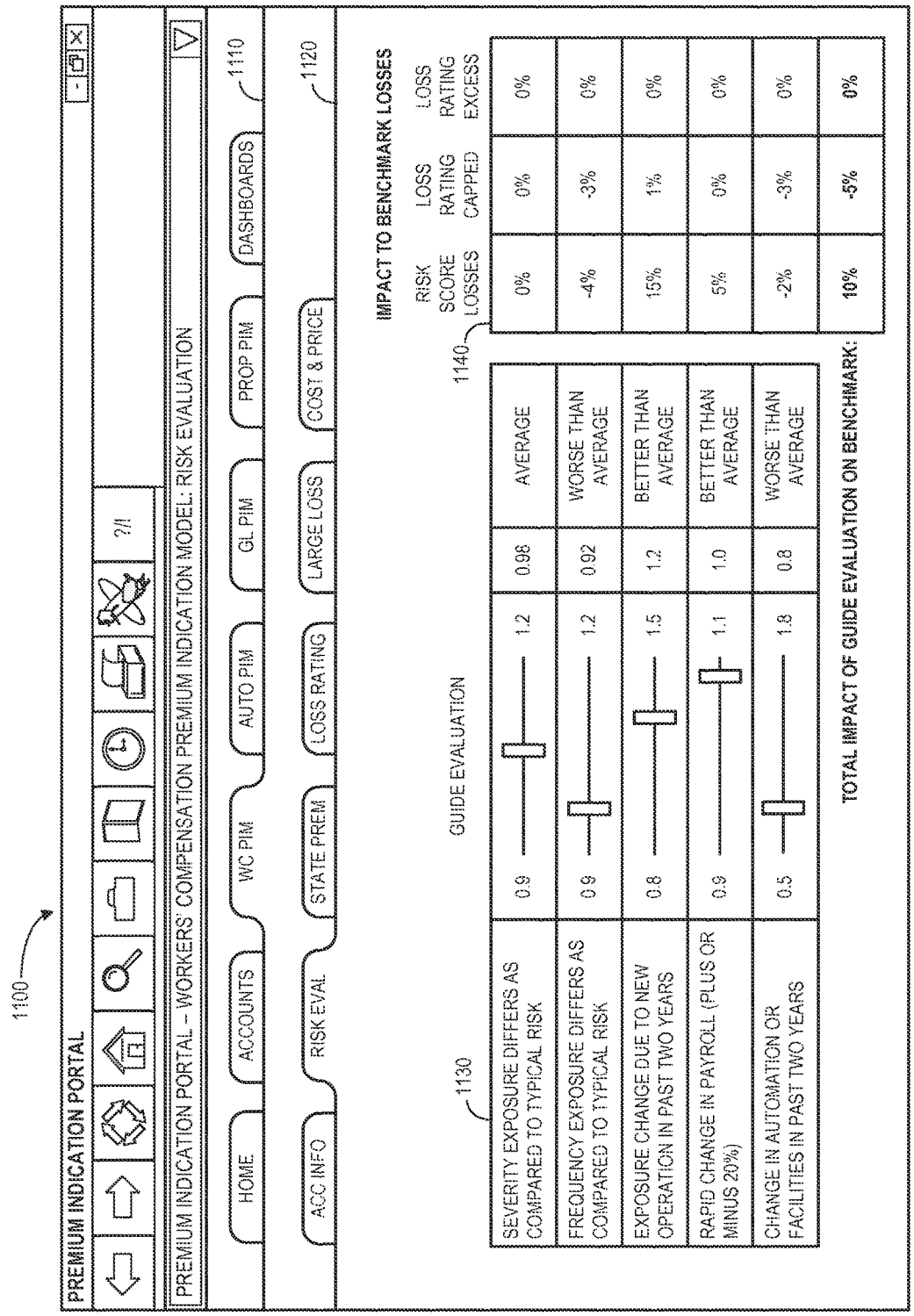
FIG. 11 is an example of a premium indication portal risk evaluation page in accordance with some embodiments.

FIG. 11 is an example of a premium indication portal risk evaluation page 1100 in accordance with some embodiments. In particular, the underwriter has selected "risk evaluation" in the lower level tab selection 1120. As a result, a number of guide evaluation factors 1130 are displayed. The underwriter may then use his or her expertise to provide further guidance about these factors. In particular, he or she may use a slider to indicate, between a minimum and maximum adjustment, which value should be used. For example, a newly implemented safety program may cause the underwriter to indicate that the premium should be adjusted lower because the potential insured's risk is better than average. The impact of the guide evaluation inputs to the benchmark losses 1140 are displayed along with the total impact of the guide evaluation on the benchmark. The guide evaluation factors 1130 may be associated with, for example, the guide indication process 444 described with respect to FIG. 4.

Although sliders are illustrated in FIG. 11, note that an underwriter might provide guide evaluations factors 1130 information in any of a number of different ways. For example, he or she might enter a numeric value and/or answer a series of multiple choice questions to adjust the benchmark values. Further note that the minimum and maximum adjustments might be dynamically modified based on, for example, the line of business, an industry associated with the potential insurance policy, information about the underwriter (e.g., his or her amount of experience or prior performance in actually providing guide evaluation factors 1130) and/or other guide evaluation inputs (e.g., setting one factor to a maximum value might limit how high another factor is allowed to be adjusted). Further note that changes to the guide evaluation factors 1130 may be automatically and dynamically reflected in substantially real time across the premium indication portal risk evaluation page 1100 and/or any of the other pages displayed throughout the premium indication portal. Note that the particular risks included in the particular set of guide evaluation factors 1130 provided on the page 1100 may change and/or be dynamically based on, for example, a line of business, a potential insured, an underwriter identifier, and/or a relation to another guide indication adjustment. The questions displayed for the guide evaluation factors 1130 may be dynamic and may be determined or modified "on the fly" by, for example: (i) account characteristics such as the type of operations of the business, the industry the business operates in, or the size of the business, or (ii) answers provided by the initial set of questions (for example, certain answers could require more questions or could possibly eliminate the need for additional questions to be asked).

Figure 12:
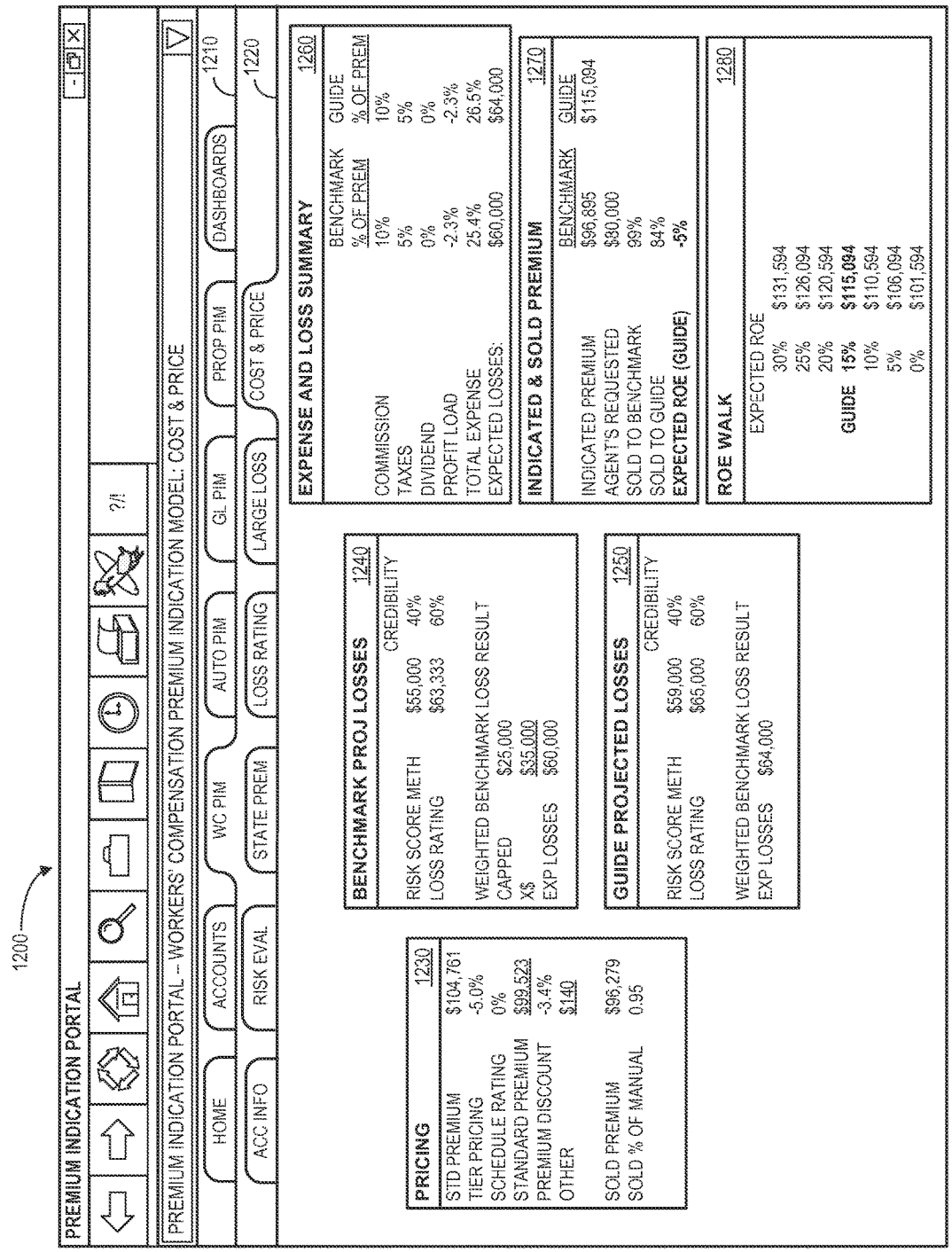
FIG. 12 is an example of a premium indication portal cost and price page in accordance with some embodiments.

FIG. 12 is an example of a premium indication portal cost and price page 1200 in accordance with some embodiments. In particular, the underwriter has selected "cost and price" in the lower level tab selection 1220. As a result, pricing information is displayed 1230 along with benchmark projected losses 1240 and guide projected losses 1250 (e.g., reflecting, dynamically and in substantially real time, the benchmark values adjusted by the guidance provided by the underwriter via the risk evaluation page 1100 of FIG. 11). The system may then automatically calculate and display an expense and loss summary 1260 along with indicated and sold premium values 1270. Note that the indicated and sold premium values 1270 may reflect an expected return on equity in view of the guidance and/or the actual premium at which the insurance policy was sold to the insured. The premium indication portal cost and price page 1200 may further include a return on equity "walk" 1280 list guide adjusted indicated premium values calibrated to various expected return on equity values, including values above and below the target or guide return on equity (15% in the example of FIG. 12).

FIG. 13 is an example of a premium indication portal account premium summary page 1300 in accordance with some embodiments. The account premium summary page 1300 may display account details 1310, including an account identifier, name, agency, underwriter, effective month and year, status, and transaction type for the account. The account premium summary page 1300 may also display a summary 1320 including a new/renewal indication, an effective date, a line of business, a total account premium, a premium mixture value, a sold-to-benchmark comparison, a sold-to-guide comparison, an expended return on equity in view of the sold value, a net rate change, and commission information for the account. A line of business summary 1330 may indicate the expiring value as a percentage of the manual along with a prospective value as a percentage of the manual.

Figure 14:
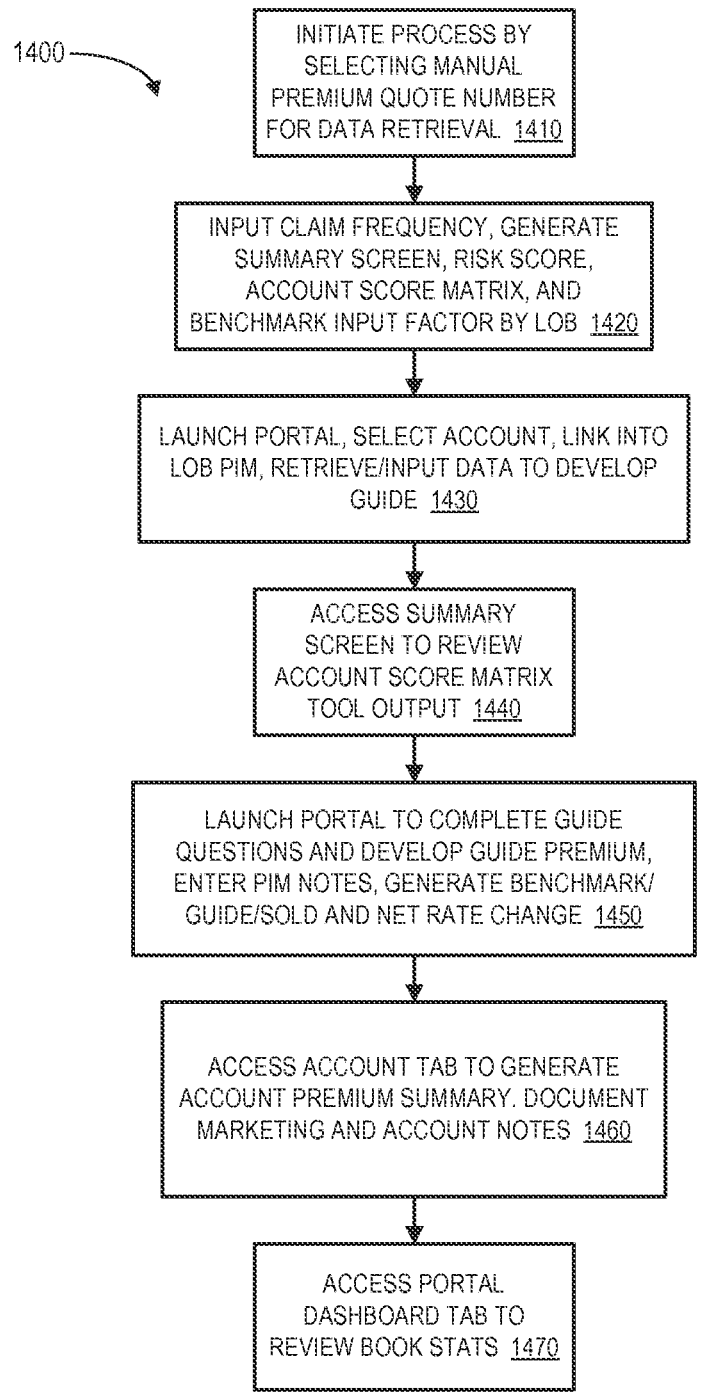
FIG. 14 is an example of a workflow in accordance with some embodiments.

FIG. 14 is an example of a workflow 1400 in accordance with some embodiments. A rater, underwriter analyst, or other party may initiate the process at 1410 by using an account score application to select a manual premium quote number for data retrieval. An underwriter analyst or other party may then use the account score application to determine, at 1420, claim frequency, a summary risk score, an account score matrix, and a benchmark input factor by line of business. Note that some or all of the steps described with respect to 1410, 1420 may be partially or fully automated (e.g., data might be automatically loaded into the system). At 1430, the underwriter analyst or other party may use, for example, a premium indication portal and/or premium indication model applications to launch the portal and link into the appropriate premium indication model application based on the line of business. The underwriter analyst or other party may also input data to develop the guide, including loss data (for new potential insurance policies) or the loss data may be automatically retrieved from a database (for potential renewals).

At 1440, an underwriter or other party may access the summary screen of the account score application to review the account score matrix output 1440 (e.g., the account score matrix 950 of FIG. 9). He or she may then use the premium indication portal and/or premium indication model applications at 1450 to complete guidance questions and develop the guide premium (e.g., via the sliders for the guidance indication factors 1130 of FIG. 11 or any other input method). The underwriter or other party may add premium indication notes as appropriate (e.g., explaining why some factors were adjusted) and generate benchmark, guide, sold, and net rate change values. At 1460, the underwriter or other party may access the account tab to generate an account premium summary, and document marketing and account notes as appropriate.

Figure 15:
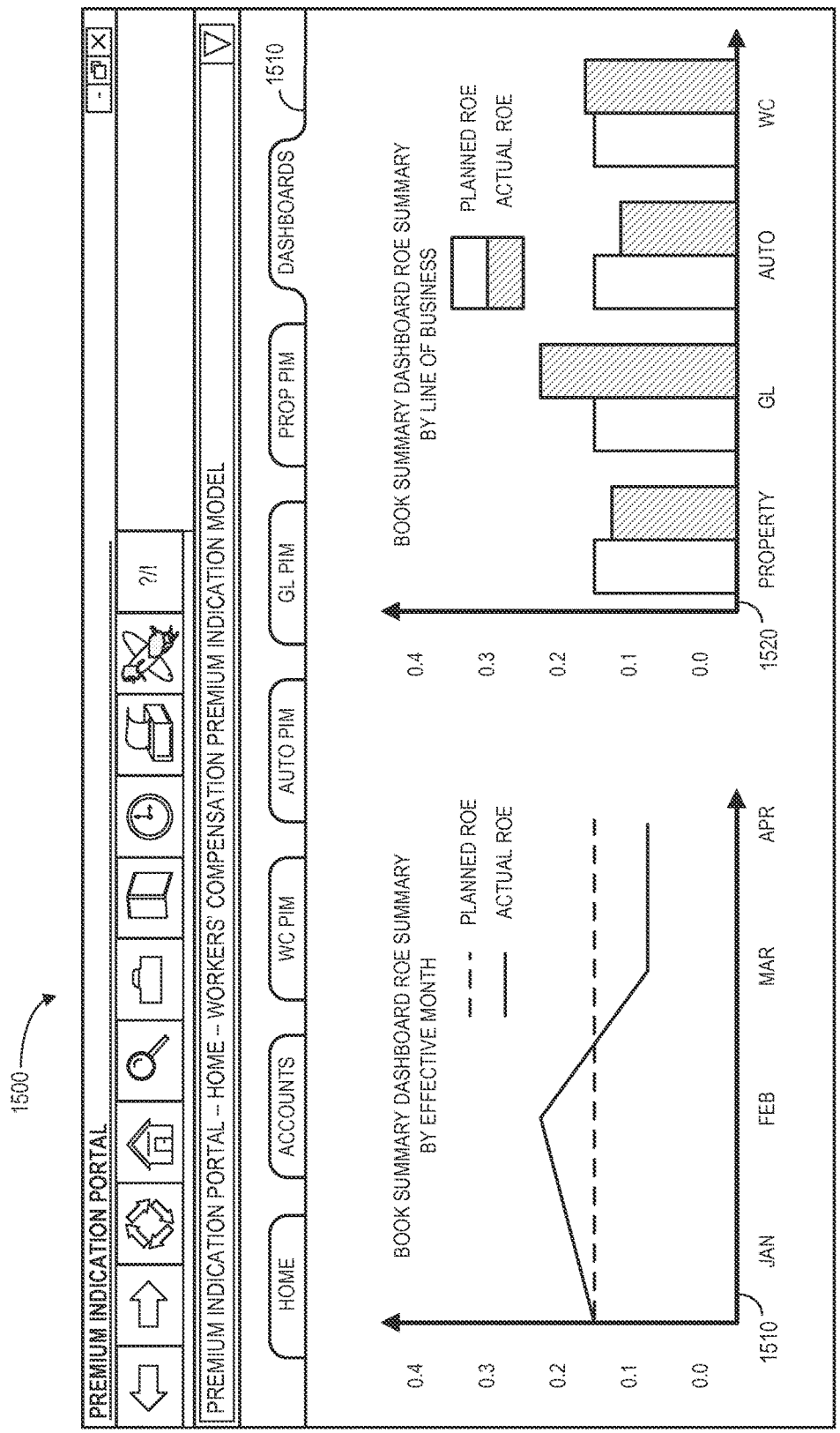
FIG. 15 is an example of a dashboard page in accordance with some embodiments.
Figure 16:
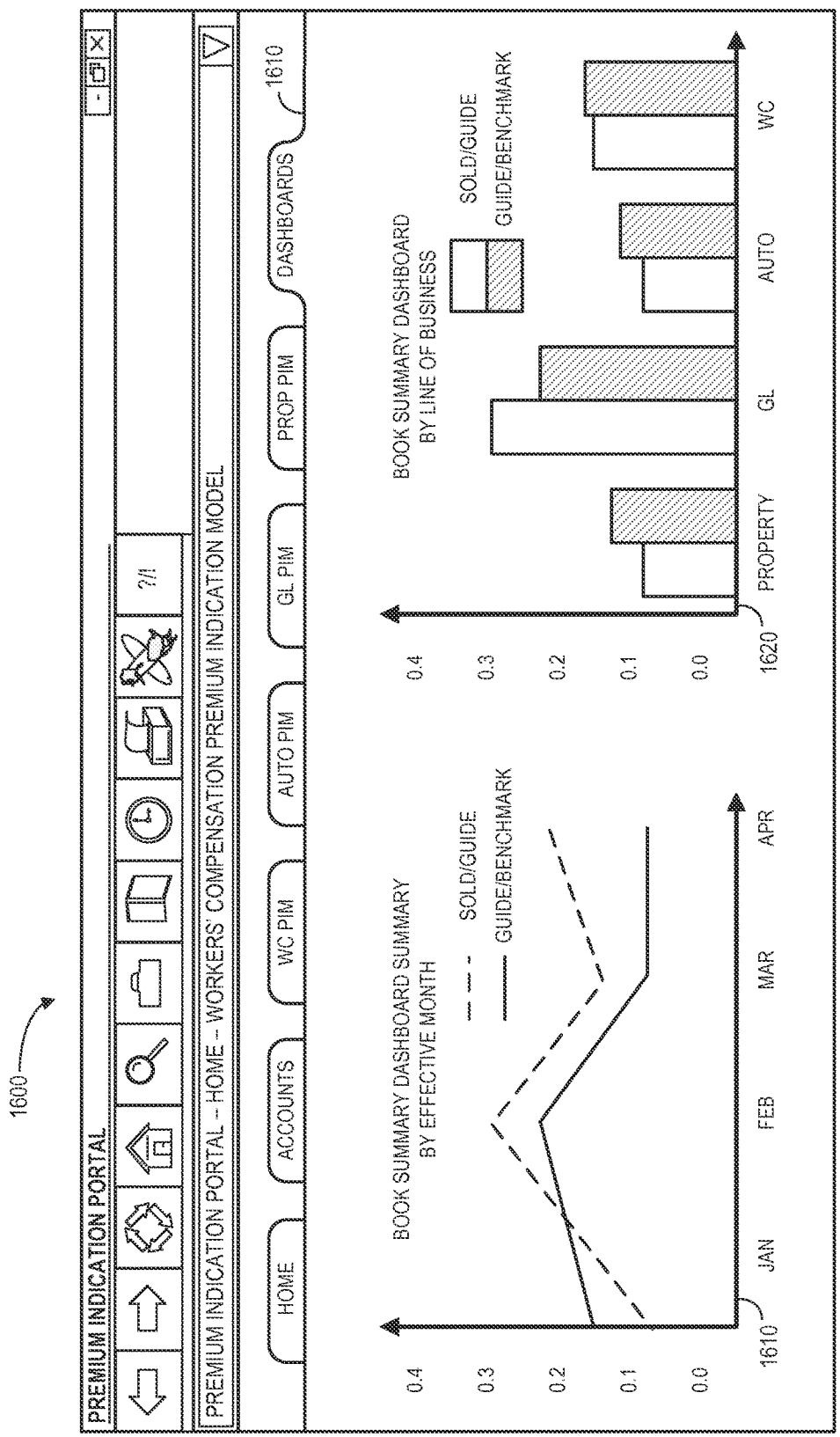
FIG. 16 is an example of another dashboard page in accordance with some embodiments.

One or more management entities or other parties may then access live, dynamic portal dashboards to review book statistics at 1470. Note that many different types of dashboards might be provided in accordance with any of the embodiments described herein. For example, a results dashboard might indicate a return on equity summary plotted over a period of time and/or a return on equity summary over multiple lines of business. FIG. 15 is an example of a dashboard page 1500 that may provide those two types of dashboards when selected by an underwriter in a high level tab selection 1510 in accordance with some embodiments. As other examples, a dashboard might indicate a sold-to-benchmark premium summary over a period of time, a sold-to-guide premium summary over a period of time, a sold-to-benchmark premium summary over multiple lines of business, and/or a sold-to-guide premium summary over multiple lines of business. FIG. 16 is an example of another dashboard page 1600 providing those displays when selected by an underwriter in a high level tab selection 1610 in accordance with some embodiments.

Figure 17:
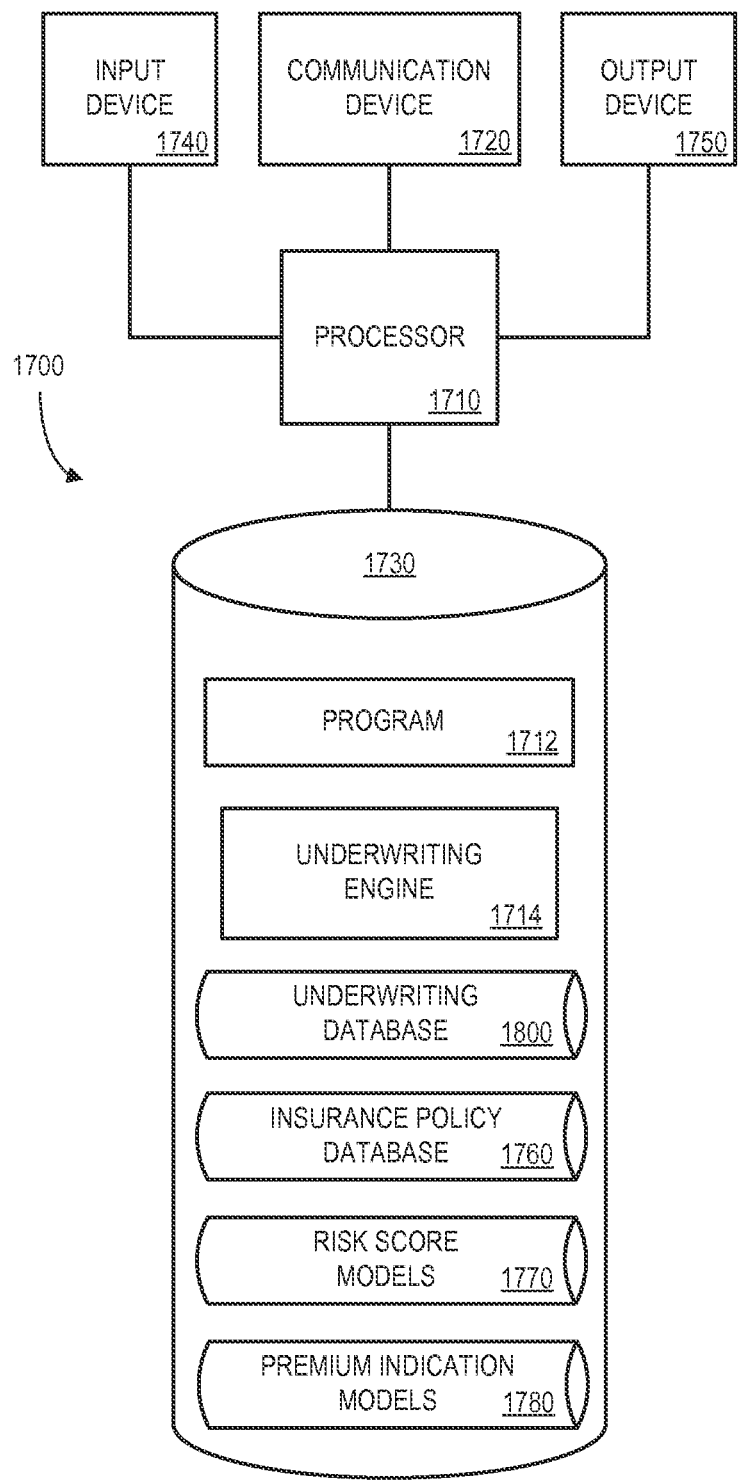
FIG. 17 is block diagram of an underwriting tool or platform according to some embodiments of the present invention.

Note that the embodiments described herein may be implemented using any number of different hardware configurations. For example, FIG. 17 illustrates an underwriting platform 1700 that may be, for example, associated with the systems 100, 200 of FIGS. 1 and 2. The underwriting platform 1700 comprises a processor 1710, such as one or more commercially available Central Processing Units (CPUs) in the form of one-chip microprocessors, coupled to a communication device 1720 configured to communicate via a communication network (not shown in FIG. 17). The communication device 1720 may be used to communicate, for example, with one or more remote underwriter devices. The underwriting platform 1700 further includes an input device 1740 (e.g., a mouse and/or keyboard to enter information about account or guidance information) and an output device 1750 (e.g., to output an indication of an account score, a score matrix, or a premium value calibrated to a return on equity).

The processor 1710 also communicates with a storage device 1730. The storage device 1730 may comprise any appropriate information storage device, including combinations of magnetic storage devices (e.g., a hard disk drive), optical storage devices, mobile telephones, and/or semiconductor memory devices. The storage device 1730 stores a program 1712 and/or an underwriting engine 1714 for controlling the processor 1710. The processor 1710 performs instructions of the programs 1712, 1714, and thereby operates in accordance with any of the embodiments described herein. For example, the processor 1710 may receive account information in connection with a potential insurance policy. The processor may also receive, from a risk score model application, an account score matrix for the potential insurance policy, including grade values comparing the account information with other insured policies in a risk database, along with a benchmark premium value calibrated to a target return on equity based on the account information and information in the risk database. The account score matrix may be displayed by the processor 1710 on an underwriter device, and guide indication adjustments may be received from the underwriter device for the potential insurance policy. The processor 1710 may then automatically calculate an adjusted premium value calibrated to the target return on equity based at least in part on the guide indication adjustments.

The programs 1712, 1714 may be stored in a compressed, uncompiled and/or encrypted format. The programs 1712, 1714 may furthermore include other program elements, such as an operating system, a database management system, and/or device drivers used by the processor 1710 to interface with peripheral devices.

As used herein, information may be "received" by or "transmitted" to, for example: (i) the underwriting platform 1700 from another device; or (ii) a software application or module within the underwriting platform 1700 from another software application, module, or any other source.

In some embodiments (such as shown in FIG. 17), the storage device 1730 further stores an underwriting database 1800, an insurance policy database 1760, risk score model applications 1770, and premium indication model applications 1780. An example of a database that may be used in connection with the underwriting platform 1700 will now be described in detail with respect to FIG. 18. Note that the database described herein is only an example, and additional and/or different information may be stored therein. Moreover, various databases might be split or combined in accordance with any of the embodiments described herein. For example, the underwriting database 1800 and/or the insurance policy database 1760 might be combined and stored within the underwriting engine 1714.

Figure 18:
FIG. 18 is a tabular portion of an underwriting database according to some embodiments.

Referring to FIG. 18, a table is shown that represents the underwriting database 1800 that may be stored at the underwriting platform 1700 according to some embodiments. The table may include, for example, entries identifying potential insurance policies to be processed in accordance with some embodiments described herein. The table may also define fields 1802, 1804, 1806, 1808, 1810, 1812 for each of the entries. The fields 1802, 1804, 1806, 1808, 1810, 1812 may, according to some embodiments, specify: a potential policy identifier 1802, an insured name 1804, an account score 1806, a benchmark premium to achieve desired return on equity 1808, a guide indication adjusted premium to achieve desired return on equity 1810, and a status 1812. The underwriting database 1800 may be created and updated, for example, as the underwriter processes a received submission.

The policy identifier 1802 may be, for example, a unique alphanumeric code identifying a received submission. The name 1804 may indicate who submitted the request for an insurance quote. The account score 1806 may reflect a level of risk associated with the potential insurance policy (as determined by a pricing model application based on the account information). The benchmark premium to achieve desired return on equity 1808 may be automatically calculate based on the account score 1806 (and/or other account information). The guide indication adjusted premium to achieve desired return on equity 1810 may represent benchmark premium adjusted in view of the underwriter's expertise (as reflected by the guide adjustments he or she provided). The status 1812 might indicate that the quote is in process, has already been sold to the insured, etc.

Thus, embodiments described herein may facilitate underwriting decisions. According to some embodiments, one or more predictive model applications may be used in connection with the underwriting processes. As used herein, the phrase "predictive model application" might refer to, for example, any of a class of algorithms that are used to understand relative factors contributing to an outcome, estimate unknown outcomes, discover trends, and/or make other estimations based on a data set of factors collected across prior trials. Note that a predictive model application might refer to, but is not limited to, methods such as ordinary least squares regression, logistic regression, decision trees, neural networks, generalized linear model applications, and/or Bayesian model applications. The predictive model application might be trained with historical claim transaction data, and be applied to current claim transactions to determine how the current claim transactions should be handled. Both the historical claim transaction data and data representing the current claim transactions might include, according to some embodiments, indeterminate data or information extracted therefrom. For example, such data/information may come from narrative and/or medical text notes associated with a claim file.

Figure 19:
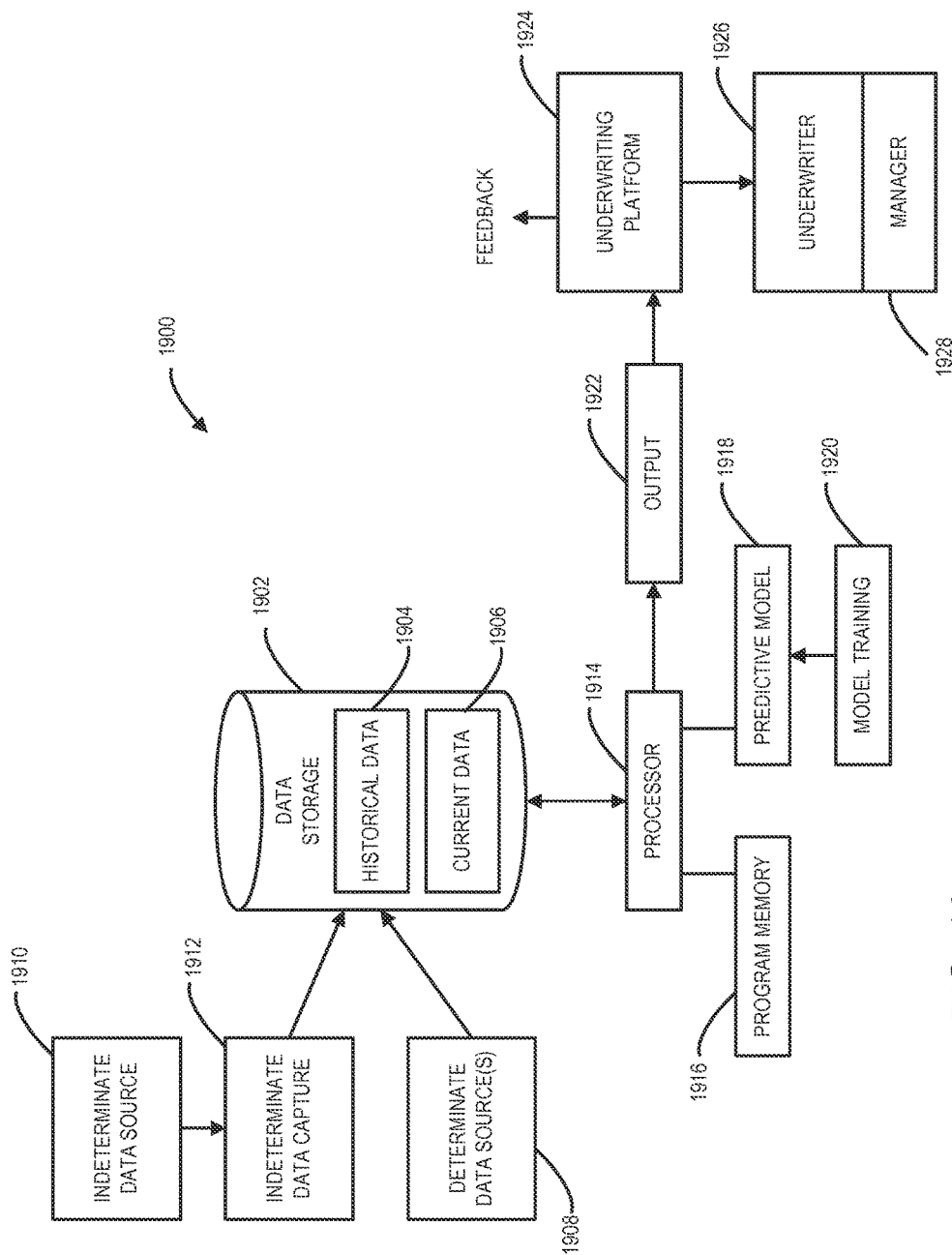
FIG. 19 is a partially functional block diagram that illustrates aspects of a computer system provided in accordance with some embodiments of the invention.

Features of some embodiments associated with a predictive model application will now be described by first referring to FIG. 19. FIG. 19 is a partially functional block diagram that illustrates aspects of a computer system 1900 provided in accordance with some embodiments of the invention. For present purposes it will be assumed that the computer system 1900 is operated by an insurance company (not separately shown) for the purpose of facilitating risk evaluation and/or underwriting decisions as appropriate.

The computer system 1900 includes a data storage module 1902. In terms of its hardware the data storage module 1902 may be conventional, and may be composed, for example, by one or more magnetic hard disk drives. A function performed by the data storage module 1902 in the computer system 1900 is to receive, store and provide access to both historical claim transaction data (reference numeral 1904) and current claim transaction data (reference numeral 1906). As described in more detail below, the historical claim transaction data 1904 is employed to train a predictive model application to provide an output that indicates how a claim should by assigned to claim handler, and the current claim transaction data 1906 is thereafter analyzed by the predictive model application. Moreover, as time goes by, and results become known from processing current claim transactions, at least some of the current claim transactions may be used to perform further training of the predictive model application. Consequently, the predictive model application may thereby adapt itself to changing claim patterns.

Either the historical claim transaction data 1904 or the current claim transaction data 1906 might include, according to some embodiments, determinate and indeterminate data. As used herein and in the appended claims, "determinate data" refers to verifiable facts such as the date of birth, age or name of a claimant or name of another individual or of a business or other entity; a type of injury, accident, sickness, or pregnancy status; a medical diagnosis; a date of loss, or date of report of claim, or policy date or other date; a time of day; a day of the week; a vehicle identification number, a geographic location; and a policy number.

As used herein and in the appended claims, "indeterminate data" refers to data or other information that is not in a predetermined format and/or location in a data record or data form. Examples of indeterminate data include narrative speech or text, information in descriptive notes fields and signal characteristics in audible voice data files. Indeterminate data extracted from medical notes or accident reports might be associated with, for example, an amount of loss and/or details about how an accident occurred.

The determinate data may come from one or more determinate data sources 1908 that are included in the computer system 1900 and are coupled to the data storage module 1902. The determinate data may include "hard" data like the claimant's name, date of birth, social security number, policy number, address; the date of loss; the date the claim was reported, etc. One possible source of the determinate data may be the insurance company's policy database (not separately indicated) and premium data. Another possible source of determinate data may be from data entry by the insurance company's claims intake administrative personnel.

The indeterminate data may originate from one or more indeterminate data sources 1910, and may be extracted from raw files or the like by one or more indeterminate data capture modules 1912. Both the indeterminate data source(s) 1910 and the indeterminate data capture module(s) 1912 may be included in the computer system 1900 and coupled directly or indirectly to the data storage module 1902. Examples of the indeterminate data source(s) 1910 may include data storage facilities for document images, for text files (e.g., claim handlers' notes) and digitized recorded voice files (e.g., claimants' oral statements, witness interviews, claim handlers' oral notes, etc.). Examples of the indeterminate data capture module(s) 1912 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, claim handlers' opinions may be extracted from their narrative text file notes.

The computer system 1900 also may include a computer processor 1914. The computer processor 1914 may include one or more conventional microprocessors and may operate to execute programmed instructions to provide functionality as described herein. Among other functions, the computer processor 1914 may store and retrieve historical claim transaction data 1904 and current claim transaction data 1906 in and from the data storage module 1902. Thus the computer processor 1914 may be coupled to the data storage module 1902.

The computer system 1900 may further include a program memory 1916 that is coupled to the computer processor 1914. The program memory 1916 may include one or more fixed storage devices, such as one or more hard disk drives, and one or more volatile storage devices, such as RAM devices. The program memory 1916 may be at least partially integrated with the data storage module 1902. The program memory 1916 may store one or more application programs, an operating system, device drivers, etc., all of which may contain program instruction steps for execution by the computer processor 1914.

The computer system 1900 further includes a predictive model application component 1918. In certain practical embodiments of the computer system 1900, the predictive model application component 1918 may effectively be implemented via the computer processor 1914, one or more application programs stored in the program memory 1916, and data stored as a result of training operations based on the historical claim transaction data 1904 (and possibly also data resulting from training with current claims that have been processed). In some embodiments, data arising from model application training may be stored in the data storage module 1902, or in a separate data store (not separately shown). A function of the predictive model application component 1918 may be to facilitate risk evaluation and/or underwriting decisions. The predictive model application component may be directly or indirectly coupled to the data storage module 1902.

The predictive model application component 1918 may operate generally in accordance with conventional principles for predictive model applications, except, as noted herein, for at least some of the types of data to which the predictive model application component is applied. Those who are skilled in the art are generally familiar with programming of predictive model applications. It is within the abilities of those who are skilled in the art, if guided by the teachings of this disclosure, to program a predictive model application to operate as described herein.

Still further, the computer system 1900 includes a model application training component 1920. The model application training component 1920 may be coupled to the computer processor 1914 (directly or indirectly) and may have the function of training the predictive model application component 1918 based on the historical claim transaction data 1904. (As will be understood from previous discussion, the model application training component 1920 may further train the predictive model application component 1918 as further relevant claim transaction data becomes available.) The model application training component 1920 may be embodied at least in part by the computer processor 1914 and one or more application programs stored in the program memory 1916. Thus the training of the predictive model application component 1918 by the model application training component 1920 may occur in accordance with program instructions stored in the program memory 1916 and executed by the computer processor 1914.

In addition, the computer system 1900 may include an output device 1922. The output device 1922 may be coupled to the computer processor 1914. A function of the output device 1922 may be to provide an output that is indicative of (as determined by the trained predictive model application component 1918) particular risk evaluation data (account scores and score matrixes) and/or underwriting data (e.g., benchmark or guide premium values). The output may be generated by the computer processor 1914 in accordance with program instructions stored in the program memory 1916 and executed by the computer processor 1914. More specifically, the output may be generated by the computer processor 1914 in response to applying the data for the current claim transaction to the trained predictive model application component 1918. The output may, for example, be a true/false flag or a number within a predetermined range of numbers. In some embodiments, the output device may be implemented by a suitable program or program module executed by the computer processor 1914 in response to operation of the predictive model application component 1918.

Still further, the computer system 1900 may include a risk evaluation and/or underwriting module 1924. The risk evaluation and/or underwriting module 1924 may be implemented in some embodiments by a software module executed by the computer processor 1914. The risk evaluation and/or underwriting module 1924 may have the function of directing workflow based on the output from the output device. Thus the risk evaluation and/or underwriting module 1924 may be coupled, at least functionally, to the output device 1922. In some embodiments, for example, the risk evaluation and/or underwriting module 1924 may direct workflow by referring information to an underwriter, analyst, manager, etc. In some embodiments, transactions may be referred to case manager 1928 who is associated with the underwriter 1926. The underwriter 1926 may be a part of the insurance company that operates the computer system 1900, and the manager 1928 might be an employee of the insurance company who reviews underwriting decisions via one or more dashboard displays. According to some embodiments, feedback information from the underwriting platform 1924 or any other element of the computer system 1900 may be used to tune or otherwise refine and/or improve any of the predictive models described herein.

In this way, embodiments described herein may help give underwriters ownership and accountability for their decisions. The decision making associated with a book of business may be decentralized with a set of simple, streamlined tools. Moreover, a common approach may be applied to both new and renewal business for the insurer. The reasons for premium adjustment are transparent, and the impact of decisions made by underwriters may be summarized and/or reviewed using dashboards.

Applicants have discovered that embodiments described herein may be particularly useful in connection with the types of insurance policies described herein. Note, however, that other types of insurance may also be associated with embodiments described herein. Moreover, the displays illustrated with respect to the FIGS. herein are only provided as examples, and embodiments may be associated with more displays (e.g., an insurance underwriting tool might actually have hundreds or more individual pages) and any other types of user interfaces. For example, FIG. 20 illustrates a tablet computer 2000 according to some embodiments. In particular, the tablet computer 2000 is displaying a guidance indication page similar to the page 1100 described with respect to FIG. 11.

Figure 21:
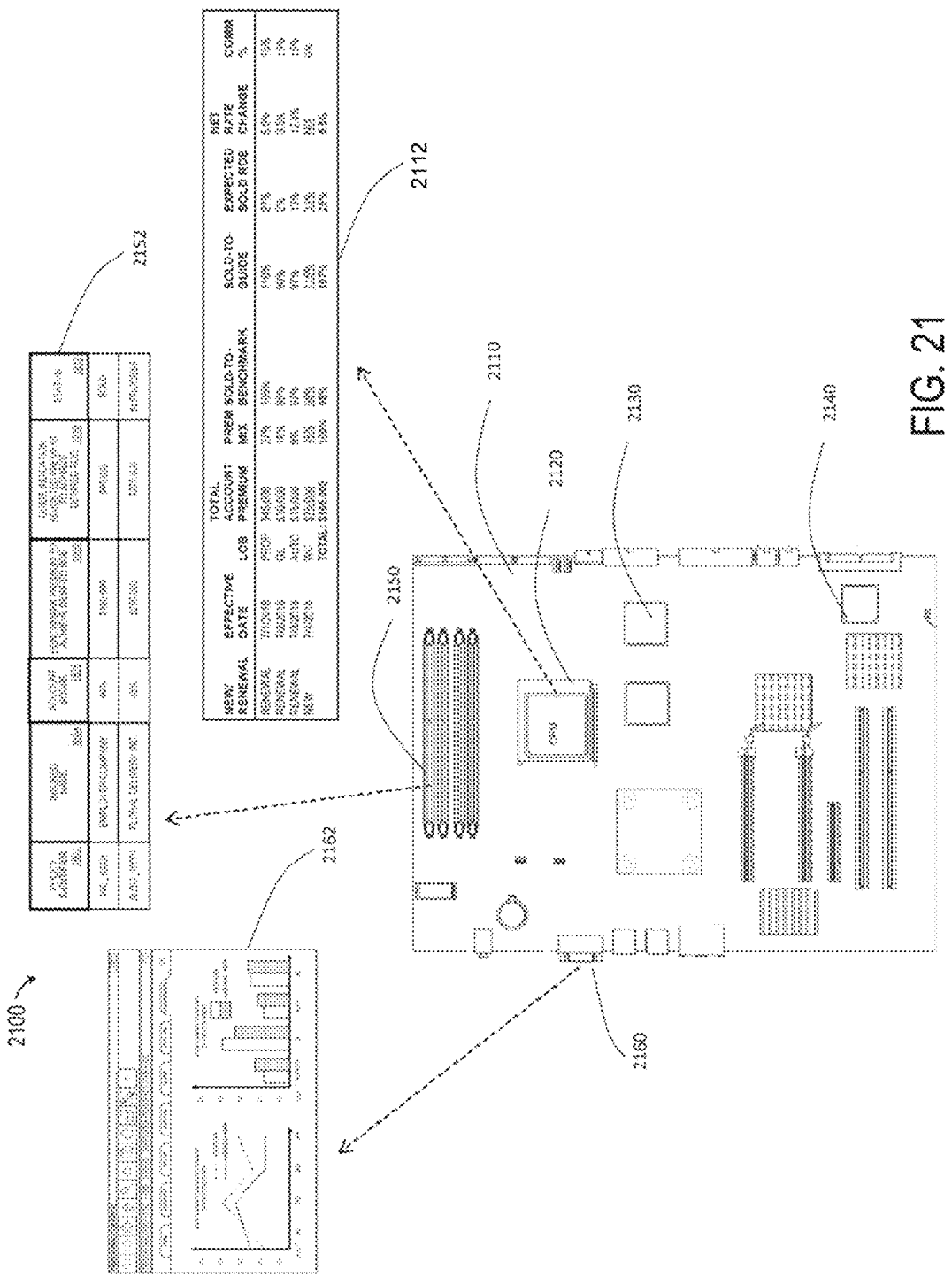
FIG. 21 is a specialized computing platform for use in accordance with some embodiments of the present invention

Referring to FIG. 21, a specialized computing platform 2100 is shown for use in accordance with some embodiments of the present invention. The computing platform 2100 includes a motherboard 2110 having a plurality of component including a CPU 2120, one or more video and sound interfaces 2130, one or more controllers 2140, one or more memories 2150 and one or more ports 2160. The CPU 2120 may receive account information in connection with a potential insurance policy and may be utilized to process data 2112 associated with the present invention. The memory 2150 may be utilized to store data 2152 associated with the present invention, and the one or more ports 2160 may be utilized to output a graphical user interface 2162 associated with the present invention.

Note that the present invention provides significant technical improvements to facilitate underwriting decisions. The present invention is directed to more than merely a computer implementation of a routine or conventional activity previously known in the industry as it significantly advances the technical efficiency, access and/or accuracy of underwriting decisions by implementing a specific new method and system as defined herein. The present invention is a specific advancement in the area of underwriting decisions by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, client and/or vendor systems, networks and subsystems. For example, in the present invention underwriting decisions may be analyzed and accurately and automatically facilitated.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system including a data sharing architecture, comprising:
a communication device to receive account information in connection with a potential insurance policy;
a computer storage unit for receiving, storing, and providing data indicative of the account information;
a risk database storing a plurality of risk variables associated with a plurality of insured parties;
a risk score portal including an account score engine and a plurality of risk score model applications, each risk score model application corresponding to a different policy type and configured to generate an account score matrix for the potential insurance policy, including grade values comparing the account information to stored account information of other insured parties, along with a benchmark premium value calibrated to a target return on equity based on the account information and information in the risk database;
a premium indication portal processor in communication with the communication device, the storage unit, and the risk database, wherein the premium indication portal includes a plurality of premium indication model applications, each premium indication model application corresponding to a different policy type, and wherein the premium indication portal processor configured to:
receive, from the risk score model application based upon the risk score model application corresponding to the policy type, the account score matrix for the potential insurance policy;
render, for display on an underwriter device, a premium indication portal including:
an accounts summary tab, selectable by a user, configured to display, upon selection, a summary page for a particular account including a display of the received account score matrix and a display of the grade values comparing the account information to stored account information of other insured parties, along with the benchmark premium value calibrated to the target return on equity based on the account information and the information in the risk database; and
a plurality of premium indication model application tabs, each premium indication model application tab corresponding to a different policy type and including a display of a plurality of dynamically generated guide evaluation adjustment sliders configured to permit selective adjustment of a plurality of guide evaluation factors, wherein a minimum and a maximum adjustment permitted by each of the plurality of dynamically generated guide evaluation adjustment sliders is dynamically modifiable based upon adjustments selected for other of the plurality of guide evaluation factors;
receive, from the underwriter device, guide evaluation adjustments for one or more of the plurality of guide evaluation factors;
responsive to receipt of the guide evaluation adjustments, dynamically modify one or both of the minimum and maximum adjustment permitted by one or more of the other plurality of exposure factors;
automatically calculate, by a premium indication model application corresponding to the policy type, an adjusted premium value calibrated to the target return on equity based at least in part on the guide evaluation adjustments;
store the adjusted premium value in association with the account information; and
render, for display on the premium indication portal on the underwriter device, a cost and price page which includes the adjusted premium value.

2. The system of claim 1, wherein the potential insurance policy comprises one of: (i) a new potential insurance policy, or (ii) a potential renewal of an existing insurance policy.

3. The system of claim 1, wherein the plurality of premium indication model applications comprise: (i) a workers' compensation insurance premium indication model application, (ii) an automobile insurance premium indication model application, (iii) a general liability insurance premium indication model application, and (iv) a property insurance premium indication model application.

4. The system of claim 3, wherein the account information is associated with a plurality of different types of potential insurance policies.

5. The system of claim 1, wherein the account information includes at least five of: (i) an account name, (ii) an account identifier, (iii) insurance agency information, (iv) location information, (v) an underwriter identifier, (vi) effective time period information, (vii) a status, (viii) a transaction type, (ix) at least one insurance policy identifier, (x) an industry code, and (xii) an industry description.

6. The system of claim 1, wherein the account score matrix includes grade values for each of a plurality of risk variables in the risk database, each grade reflecting a percentage of other insured parties having a level of risk, for the associated risk variable, worse than the potential insurance policy.

7. The system of claim 6, wherein at least one risk variable is associated with at least one of: (i) an industry classification, (ii) geographic information, (iii) payroll size, (iv) average wage data, (v) prior claim frequency, (vi) prior claim amounts, (vii) an overall number of locations, (viii) business credit risk factors, (ix) a number of years in business, (x) a fleet size, (xi) driver age information, vehicle (xii) weight information, (xiii) an overall exposure size, (xiv) an exposure type, (xv) a building age, and (xvi) weather related data.

8. The system of claim 1, wherein at least one guide evaluation factor is associated with: (i) an unusual severity exposure, (ii) an unusual frequency exposure, (iii) a new operation, (iv) a rapid change in payroll, (v) a change in automation or facilities, and (vi) a loss control program.

9. The system of claim 1, wherein the processor is further configured for associating the account information with a sold premium value.

10. The system of claim 9, wherein the processor is further configured to display a selectable dashboards tab, selectable by a user, configured to display, upon selection, a results dashboard indicating at least one of: (i) return on equity summary plotted over a period of time, (ii) a return on equity summary over multiple lines of business, (iii) a sold-to-benchmark premium summary over a period of time, (iv) a sold-to-guide premium summary over a period of time, (v) a sold-to-benchmark premium summary over multiple lines of business, and (vi) a sold-to-guide premium summary over multiple lines of business.

11. The system of claim 9, wherein the process is further configured for evaluating an underwriter based on guide evaluation adjustments for a plurality of potential insurance policies along with sold premium values and subsequent loss information associated with the plurality of potential insurance policies.

12. A computer-implemented method, comprising:
receiving account information in connection with a potential insurance policy;
receiving, at a premium indication portal processor from a risk score portal including an account score engine and a plurality of risk score model applications, each risk score model application corresponding to a different policy type, an account score matrix for the potential insurance policy, including grade values comparing the account information with other insured policies in a risk database, along with a benchmark premium value calibrated to a target return on equity based on the account information and information in the risk database;
rendering, by the premium indication portal processor for display on an underwriter device, a premium indication portal including:
an accounts summary tab, selectable by a user, configured to display, upon selection, a summary page for a particular account including a display of the received account score matrix and a display of the grade values comparing the account information to stored account information of other insured parties, along with the benchmark premium value calibrated to the target return on equity based on the account information and the information in the risk database; and
a plurality of premium indication model application tabs, each premium indication model application tab corresponding to a different policy type and including a display of a plurality of dynamically generated guide evaluation adjustment sliders configured to permit selective adjustment of a plurality of guide evaluation factors, wherein a minimum and a maximum adjustment permitted by each of the plurality of dynamically generated guide evaluation adjustment sliders is dynamically modifiable based upon adjustments;
receiving, by the premium indication portal processor from underwriter device, guide evaluation adjustments for one or more of the plurality of guide evaluation factors;
responsive to receipt of the guide evaluation adjustments, dynamically modifying one or both of the minimum and maximum adjustment permitted by one or more of the other plurality of exposure factors;
automatically calculating, by the premium indication portal processor, an adjusted premium value calibrated to the target return on equity based at least in part on the guide evaluation adjustments;
storing the adjusted premium value in association with the account information; and
transmitting an indication of the adjusted premium value to the underwriter device.

13. The method of claim 12, wherein
the potential insurance policy comprises one of: (i) a new potential insurance policy, or (ii) a potential renewal of an existing insurance policy; and
the premium indication model application comprises one of: (i) a workers' compensation insurance premium indication model application, (ii) an automobile insurance premium indication model application, (iii) a general liability insurance premium indication model application, or (iv) a property insurance premium indication model application.

14. The method of claim 13, wherein the account information is associated with a plurality of different types of potential insurance policies.

15. The method of claim 14, wherein the account information includes at least five of: (i) an account name, (ii) an account identifier, (iii) insurance agency information, (iv) location information, (v) an underwriter identifier, (vi) effective time period information, (vii) a status, (viii) a transaction type, (ix) at least one insurance policy identifier, (x) an industry code, and (xii) an industry description.

16. The method of claim 15, wherein the account score matrix includes grade values for each of a plurality of risk variables in the risk database, each grade reflecting a percentage of other insured parties having a level of risk, for the associated risk variable, worse than the potential insurance policy.

17. The method of claim 16, further comprising:
associating the account information with a sold premium value, and
displaying a selectable dashboards tab, selectable by a user, configured to display, upon selection, a results dashboard indicating at least one of: (i) return on equity summary plotted over a period of time, (ii) a return on equity summary over multiple lines of business, (iii) a sold-to-benchmark premium summary over a period of time, (iv) a sold-to-guide premium summary over a period of time, (v) a sold-to-benchmark premium summary over multiple lines of business, and (vi) a sold-to-guide premium summary over multiple lines of business.

18. A system, comprising:
a risk score portal including an account score engine and a plurality of risk score model applications, each risk score model application corresponding to a different policy type and configured to generate an account score matrix for the potential insurance policy, including grade values comparing the account information to stored account information of other insured parties, along with a benchmark premium value calibrated to a target return on equity based on the account information and information in the risk database; and
a premium indication portal platform, in communication with the risk score platform, wherein the premium indication portal includes a plurality of premium indication model applications, each premium indication model application corresponding to a different policy type, and wherein the premium indication portal processor is configured to:
receive the benchmark premium values;
render, for display on an underwriter device, a premium indication portal including:
an accounts summary tab, selectable by a user, configured to display, upon selection, a summary page for a particular account including a display of the received account score matrix and a display of the grade values comparing the account information to stored account information of other insured parties, along with the benchmark premium value calibrated to the target return on equity based on the account information and the information in the risk database; and a plurality of premium indication model application tabs, each premium indication model application tab corresponding to a different policy type and including a display of a plurality of dynamically generated guide evaluation adjustment sliders configured to permit selective adjustment of a plurality of guide evaluation factors, wherein a minimum and a maximum adjustment permitted by each of the plurality of dynamically generated guide evaluation adjustment sliders is dynamically modifiable based upon adjustments selected for other of the plurality of guide evaluation factors;

receive guide evaluation adjustments from underwriting devices for one or more of the plurality of guide evaluation factors;

responsive to receipt of the guide evaluation adjustments, dynamically modify one or both of the minimum and maximum adjustment permitted by one or more of the other plurality of exposure factors; and calculate adjusted premium values for the potential insurance policies based on the guide evaluation adjustments and the premium indication model applications corresponding to the policy type.

19. The system of claim 18, wherein the potential insurance policies include both new potential insurance policies and potential insurance policy renewals.

20. The system of claim 19, wherein the potential insurance policies include all of: (i) workers' compensation insurance policies, (ii) automobile insurance policies, (iii) general liability insurance policies, and (iv) property insurance policies.

* * * * *